(12) United States Patent
Lim et al.

(10) Patent No.: US 11,991,391 B2
(45) Date of Patent: *May 21, 2024

(54) METHOD FOR INTRA PREDICTION AND DEVICE THEREFOR

(71) Applicant: LG Electronics Inc., Seoul (KR)

(72) Inventors: Jaehyun Lim, Seoul (KR); Seungwook Park, Seoul (KR); Yongjoon Jeon, Seoul (KR); Jungsun Kim, Seoul (KR); Hendry Hendry, Seoul (KR); Byeongmoon Jeon, Seoul (KR); Joonyoung Park, Seoul (KR); Chulkeun Kim, Seoul (KR); Naeri Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,307

(22) Filed: Mar. 23, 2023

(65) Prior Publication Data

US 2023/0232040 A1 Jul. 20, 2023

Related U.S. Application Data

(60) Continuation of application No. 17/190,215, filed on Mar. 2, 2021, now Pat. No. 11,750,838, which is a (Continued)

(51) Int. Cl.
*H04N 19/593* (2014.01)
*H04N 19/11* (2014.01)
(Continued)

(52) U.S. Cl.
CPC ........... *H04N 19/593* (2014.11); *H04N 19/11* (2014.11); *H04N 19/117* (2014.11);
(Continued)

(58) Field of Classification Search
None
See application file for complete search history.

(56) References Cited

U.S. PATENT DOCUMENTS

| 2005/0089235 A1 | 4/2005 | Sakaguchi et al. |
| 2005/0249278 A1 | 11/2005 | Sasai et al. |

(Continued)

FOREIGN PATENT DOCUMENTS

| CN | 1612614 | 5/2005 |
| CN | 101222635 | 7/2008 |

(Continued)

OTHER PUBLICATIONS

Bross et al., "High efficiency video coding (HEVC) text specification draft 8," JCTVC-J1003 d7, Joint Collaborative Team on Video Coding (JCT-VC) ofITU-T SG 16 WP3 and ISO/IEC JTC1/SC29/WG11, 10th Meeting: Stockholm, SE, dated Jul. 11-20, 2012, 260 pages.

(Continued)

*Primary Examiner* — Chikaodili E Anyikire
(74) *Attorney, Agent, or Firm* — Fish & Richardson P.C.

(57) ABSTRACT

A method for intra prediction comprises determining a first MPM candidate corresponding to a left-side candidate block on the basis of a position of the left-side candidate block adjacent to a left side of a current block; determining a second MPM candidate corresponding to an upper-end candidate block on the basis of a position of the upper-end candidate block adjacent to an upper end of the current block; generating an MPM candidate list including a plurality of MPM candidates, on the basis of the first MPM candidate and the second MPM candidate; and determining one MPM candidate of the plurality of MPM candidates that constitute the MPM candidate list as an intra prediction mode of the current block, and performing intra prediction for the current block on the basis of the determined intra (Continued)

prediction mode to generate a prediction block corresponding to the current block.

3 Claims, 14 Drawing Sheets

Related U.S. Application Data continuation of application No. 17/103,333, filed on Nov. 24, 2020, now Pat. No. 11,290,744, which is a continuation of application No. 16/434,950, filed on Jun. 7, 2019, now Pat. No. 10,880,574, which is a division of application No. 15/963,787, filed on Apr. 26, 2018, now Pat. No. 10,349,082, which is a division of application No. 15/845,690, filed on Dec. 18, 2017, now Pat. No. 10,334,272, which is a continuation of application No. 15/070,832, filed on Mar. 15, 2016, now Pat. No. 9,848,206, which is a continuation of application No. 14/256,059, filed on Apr. 18, 2014, now Pat. No. 9,319,683, which is a continuation of application No. PCT/KR2012/008442, filed on Oct. 16, 2012.

(60) Provisional application No. 61/557,385, filed on Nov. 8, 2011, provisional application No. 61/548,706, filed on Oct. 18, 2011.

(51) Int. Cl.
| | |
|---|---|
| *H04N 19/117* | (2014.01) |
| *H04N 19/122* | (2014.01) |
| *H04N 19/124* | (2014.01) |
| *H04N 19/129* | (2014.01) |
| *H04N 19/13* | (2014.01) |
| *H04N 19/159* | (2014.01) |
| *H04N 19/174* | (2014.01) |
| *H04N 19/176* | (2014.01) |
| *H04N 19/426* | (2014.01) |
| *H04N 19/44* | (2014.01) |
| *H04N 19/463* | (2014.01) |
| *H04N 19/61* | (2014.01) |
| *H04N 19/625* | (2014.01) |
| *H04N 19/82* | (2014.01) |
| *H04N 19/96* | (2014.01) |

(52) U.S. Cl.
CPC ......... *H04N 19/122* (2014.11); *H04N 19/124* (2014.11); *H04N 19/129* (2014.11); *H04N 19/13* (2014.11); *H04N 19/159* (2014.11); *H04N 19/174* (2014.11); *H04N 19/176* (2014.11); *H04N 19/426* (2014.11); *H04N 19/44* (2014.11); *H04N 19/463* (2014.11); *H04N 19/61* (2014.11); *H04N 19/625* (2014.11); *H04N 19/82* (2014.11); *H04N 19/96* (2014.11)

(56) References Cited

U.S. PATENT DOCUMENTS

| | | | |
|---|---|---|---|
| 2006/0120456 A1 | 6/2006 | Tasaka et al. | |
| 2008/0084491 A1 | 4/2008 | He et al. | |
| 2008/0232471 A1* | 9/2008 | Mittal | H04N 19/176 375/240.13 |
| 2009/0147855 A1 | 6/2009 | Song et al. | |
| 2010/0080296 A1 | 4/2010 | Lee et al. | |
| 2010/0226437 A1 | 9/2010 | Robertson et al. | |
| 2011/0280304 A1 | 11/2011 | Jeon et al. | |
| 2012/0106636 A1 | 5/2012 | Kim | |
| 2012/0177113 A1 | 7/2012 | Guo | |
| 2012/0224777 A1 | 9/2012 | Kim | |
| 2012/0307894 A1 | 12/2012 | Chien | |
| 2012/0314766 A1* | 12/2012 | Chien | H04N 19/176 375/240.12 |
| 2013/0016788 A1 | 1/2013 | Oh | |
| 2013/0022122 A1 | 1/2013 | Oh | |
| 2013/0266064 A1* | 10/2013 | Zhang | H04N 19/50 375/240.12 |
| 2013/0272405 A1 | 10/2013 | Jeon et al. | |
| 2015/0139314 A1* | 5/2015 | Seregin | H04N 19/105 375/240.12 |
| 2015/0163506 A1 | 6/2015 | Chon et al. | |
| 2017/0019665 A1 | 1/2017 | Chen et al. | |

FOREIGN PATENT DOCUMENTS

| | | |
|---|---|---|
| CN | 101605255 | 12/2009 |
| CN | 101677406 | 3/2010 |
| CN | 101854551 | 10/2010 |
| CN | 101884219 | 11/2010 |
| CN | 102209243 | 10/2011 |
| EP | 2719180 | 12/2012 |
| EP | 2774120 | 5/2013 |
| EP | 2774122 | 5/2013 |
| EP | 2774374 | 5/2013 |
| JP | 2006005438 | 1/2006 |
| KR | 10-2007-0005848 | 1/2007 |
| KR | 1020100112247 | 10/2010 |
| KR | 1020110003414 | 1/2011 |
| KR | 1020110019855 | 3/2011 |
| KR | 1020180057727 | 5/2018 |
| KR | 102149965 | 8/2020 |
| KR | 102210473 | 2/2021 |
| KR | 102278501 | 7/2021 |
| WO | WO2011004986 | 1/2011 |
| WO | WO2011021844 | 2/2011 |
| WO | WO12170812 | 12/2012 |
| WO | WO13064094 | 5/2013 |
| WO | WO13064099 | 5/2013 |
| WO | WO13064100 | 5/2013 |

OTHER PUBLICATIONS

Chen, "BoG report on intra mode coding with fixed No. of MPM candidates," JCTVC-F765-v4, Joint Collaborative Team on Video Coding (JCT-VC) of ITU-T SG16 WP3 and ISO/IEC JTC1/SC29/WG11, 6th Meeting: Torino, dated Jul. 14-22, 2011, 3 pages.
Chen, "BoG report on intra mode coding with fixed No. of MPM candidates," JCTVC-F765-v5, Joint Collaborative Team on Video Coding (JCT-VC) of Itu-T SG16 WP3 and ISO/IEC JTC1/SC29/WG11, dated Aug. 4, 2011, 19 pages.
Chien et al., "Parsing friendly intra mode coding," Joint Collaborative Team on Video Coding (JCT-VG) ofITU-T SG16 WP3 and ISO/IEC JTC1/SC29/WG11, Document: JCTVC-F459, 6th Meeting: Torino, IT, Jul. 14-22, 2011, 5 pages.
Chuang et al., "CE1.A.3: Reducing line buffers for CABAG," Joint Collaborative Team on Video Coding (JCT-VG) ofITU-T SG16 WP3 and ISO/IEC JTC1/SC29/WG11, Document: JCTVC-G200, 7th Meeting: Geneva, CH, Nov. 21-30, 2011, 5 pages.
Chuang et al., "Reducing Line Buffers for Motion Data and CABAC," JCTVC-F060, Joint Collaborative Team on Video Coding (JCT-VC) of ITU-T SG16 WP3 and ISO/IEC JTC1/SC29/WG11, 6th Meeting: Torino, IT, dated Jul. 14-22, 2011, 7 pages.
EP Extended European Search Report in European Appln. No. 21165675.6, dated Jul. 2, 2021, 19 pages.
European Search Report in European Appln. No. 12840984.4, dated May 29, 2015, 11 pages.
Extended European Search Report in European Appln, No. 18172005.3, dated Jun. 21, 2018, 18 pages.
Jianle Chen, "BoG report on intra mode coding with fixed No. of MPM candidates," JCTVC-F765, Joint Collaborative Team on Video Coding (JCT-VC) of Itu-T SG16 WP3 and Iso/Iec JTC1/SC29/WG11, Torino, dated Jul. 14-22, 2011, 3 pages.

(56) References Cited

OTHER PUBLICATIONS

Korean Final Office Action in Korean Appln. No. 10-2014-7010228, dated Jun. 3, 2020, 10 pages (with English translation).
Korean Notice of Allowance in Korean Appln. No. 10-2018-7014077, dated May 31, 2020, 5 pages (with English translation).
Korean Office Action in Korean Appln. No. 10-2020-7024484, dated Oct. 26, 2020, 8 pages (with English translation).
KR Office Action in Korean Appln. No. 10-2021-7002666, dated Apr. 13, 2021, 11 pages (with English translation).
Lim et al., "Non-CE6: Reducing Line Buffers for Intra mode," Joint Collaborative Team on Video Coding (JCT-VG) ofITU-T SG16 WP3 and Iso/Iec JTC1/SC29/WG11, Document: JCTVC-G145, 7th Meeting: Geneva, CH, Nov. 21-30, 2011, 5 pages.
Mccann et al., "HME: High Efficiency Video Coding (HEVC) Test Model 3 Encoder Description," Joint Collaborative Team on Video Coding (JCT-VG) of Itu-T SG16 WP3 and Iso/Iec JTC1/SC29/WG11, Document: JCTVC-E602, 5th Meeting: Geneva, CH, Mar. 16-23, 2011, 34 pages.
MediaTek Inc., "CE14 Subtest 1: The Most Probable Mode Signaling for Luma," JCTVC-E088, Joint Collaborative Team on Video Coding (JCT-VC) ofITU-T SG 16 WP3 and Iso/Iec JTC1/SC29/WG11, Geneva, Switzerland, dated Mar. 16-23, 2011, 4 pages.
Office Action in Korean Appln. No. 10-2021-7021812, dated Sep. 14, 2021, 14 pages (with English translation.
PCT International Search Report in International Appln. No. PCT/KR2012/008442, dated Feb. 26, 2013, 4 pages (with English Translation).
Sasai et al., "Modified Context Derivation for Complexity Reduction," Joint Collaborative Team on Video Coding (JCT-VC) ofITU-T SG16 WP3 and ISO/IEC JTC1/SC29/WG11, Document: JCTVC-F429, 6th Meeting: Torino, IT, Jul. 14-22, 2011, 11 pages.
Seregin et al., "Intra mode parsing without access neighbouring information," JCTVC-F378, Joint Collaborative Team on Video Coding (JCT-VC) of ITU-T SG16 WP3 and ISO/IEC JTC1/SC29/WG11, 6th Meeting: Torino, IT, dated Jul. 14-22, 2011, 16 pages.
United States Final Office Action in U.S. Appl. No. 15/845,690, dated Jul. 18, 2018, 10 pages.
United States Office Action in U.S. Appl. No. 15/845,690, dated Jan. 26, 2018, 6 pages.
Office Action in Korean Appln. No. 10-2023-7009092, dated May 11, 2023, 8 pages (with English translation).
Office Action in Korean Application No. 10-2022-7018512, dated Oct. 10, 2022, 10 pages.
Office Action in U.S. Appl. No. 17/379,108, dated Sep. 30, 2022, 10 pages.
Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, Document: JCTVC-E603, 5th Meeting: Geneva, CH, Mar. 16-23, 2011, 215 pages.
Yeo et al., "Non-CE6: On intra prediction mode coding," Joint Collaborative Team on Video Coding (JCT-VG) of ITU-T SG16 WP3 and 180/IEC JTC1/SC29/WG11, Document: JCTVC-G153, 7th Meeting: Geneva, CH, Nov. 21-30, 2011, 12 pages.
Wiegand et al., "WD3: Working Draft 3 of High-Efficiency Video Coding, " JCTVC-E603, Presented at Joint Collaborative Team on Video Coding (JCT-VC) of ITU-T SG16 WP3 and 1S0/IEC JTC1/SC29/WG11, Mar. 16-23, 2011, 165 pages.

\* cited by examiner legend block in which intra prediction mode is stored block in which intra prediction mode is not stored legend block in which intra prediction mode is stored block in which intra prediction mode is not stored

METHOD FOR INTRA PREDICTION AND DEVICE THEREFOR

CROSS REFERENCE TO RELATED APPLICATIONS

This application is a continuation of U.S. application Ser. No. 17/190,215, filed on Mar. 2, 2021, which is a continuation of U.S. application Ser. No. 17/103,333, filed on Nov. 24, 2020, now U.S. Pat. No. 11,290,744, which is a continuation of U.S. application Ser. No. 16/434,950, filed on Jun. 7, 2019, now U.S. Pat. No. 10,880,574, which is a divisional of U.S. application Ser. No. 15/963,787, filed Apr. 26, 2018, now U.S. Pat. No. 10,349,082, which is a divisional of U.S. application Ser. No. 15/845,690, filed Dec. 18, 2017, now U.S. Pat. No. 10,334,272, which is a continuation of U.S. application Ser. No. 15/070,832, filed Mar. 15, 2016, now U.S. Pat. No. 9,848,206, which is a continuation of U.S. application Ser. No. 14/256,059, filed Apr. 18, 2014, now U.S. Pat. No. 9,319,683, which is a continuation of International Application No. PCT/KR2012/008442, filed on Oct. 16, 2012, which claims the benefit of U.S. Provisional Application No. 61/548,706, filed on Oct. 18, 2011, and U.S. Provisional Application No. 61/557,385, filed on Nov. 8, 2011, the entire contents of the prior applications are incorporated by reference.

TECHNICAL FIELD

The present invention relates to image processing, and more particularly, to an intra prediction method and apparatus.

BACKGROUND ART

Recently, there is a growing demand for images with high resolution and high quality such as high definition (HD) images and ultra high definition (UHD) images in various fields. In comparison with the existing image data, high resolution and high quality image data requires a relatively great information amount or bit amount. Therefore, a transmission cost and a storage cost are increased when the image data is transmitted by using a medium such as the existing wired/wireless broadband line or when the image data is stored by using the existing storage medium. To solve these problems, high-efficient image compression techniques may be used.

As the image compression technique, there are various techniques such as an inter prediction technique which predicts a pixel value included in a current picture from a previous and/or next picture of the current picture, an intra prediction technique which predicts a pixel value included in a current picture by using pixel information in the current picture, an entropy encoding technique which allocates a short codeword to a value having a high appearance frequency and allocates a long codeword to a value having a low appearance frequency, etc. Such an image compression technique may be used to transmit or store image data by effectively compressing the image data.

SUMMARY OF INVENTION

Technical Problem

The present invention provides an image coding method and apparatus capable of improving a coding/decoding efficiency.

The present invention also provides an image decoding method and apparatus capable of improving a coding/decoding efficiency.

The present invention also provides an intra prediction method and apparatus capable of improving a coding/decoding efficiency.

The present invention also provides an intra prediction mode deriving method and apparatus capable of improving a coding/decoding efficiency.

Technical Solution

According to an aspect of the present invention, an intra prediction method is provided. The method includes: determining a first most probable mode (MPM) candidate corresponding to a left candidate block on the basis of a location of the left candidate block adjacent to a left side of a current block; determining a second MPM candidate corresponding to an upper candidate block on the basis of a location of the upper candidate block adjacent to an upper portion of the current block; generating an MPM candidate list including a plurality of MPM candidates on the basis of the first MPM candidate and the second MPM candidate; and determining one MPM candidate as an intra prediction mode of the current block among a plurality of MPM candidates constituting the MPM candidate list, and performing an intra prediction on the current block on the basis of the determined intra prediction mode, so as to generate a prediction block corresponding to the current block.

In the aforementioned aspect of the present invention, at least one MPM candidate between the first MPM candidate and the second MPM candidate may be determined according to whether a candidate block corresponding to the at least one MPM candidate between the left candidate block and the upper candidate block is located outside a coding tree block (CTB) to which the current block belongs.

In addition, if the upper candidate is located outside the CTB to which the current block belongs, the determining of the first MPM candidate may further include assigning a specific intra prediction mode to the upper candidate block, and determining the intra prediction mode assigned to the upper candidate block as the first MPM candidate.

In addition, the specific intra prediction mode may be a DC mode.

In addition, in the determining of the first MPM candidate, if the left candidate block is located outside a current picture to which the current block belongs, the first MPM candidate may be determined to a DC mode, and in the determining of the second MPM candidate, if the upper candidate block is located outside the current picture, the second MPM candidate may be determined to the DC mode.

In addition, in the determining of the first MPM candidate, if the left candidate block is located outside a current slice to which the current block belongs, the first MPM candidate may be determined to a DC mode, and in the determining of the second MPM candidate, if the upper candidate block is located outside the current slice, the second MPM candidate may be determined to the DC mode.

In addition, in the determining of the first MPM candidate, if a prediction mode of the left candidate block is not an intra mode, the first MPM candidate may be determined to a DC mode, and in the determining of the second MPM candidate, if a prediction mode of the upper candidate block is not the intra mode, the second MPM candidate may be determined to the DC mode.

According to another aspect of the present invention, an image decoding method is provided. The method includes:

determining a first MPM candidate corresponding to a left candidate block on the basis of a location of the left candidate block adjacent to a left side of a current block; determining a second MPM candidate corresponding to an upper candidate block on the basis of a location of the upper candidate block adjacent to an upper portion of the current block; generating an MPM candidate list including a plurality of MPM candidates on the basis of the first MPM candidate and the second MPM candidate; determining one MPM candidate as an intra prediction mode of the current block among a plurality of MPM candidates constituting the MPM candidate list, and performing an intra prediction on the current block on the basis of the determined intra prediction mode to generate a prediction block corresponding to the current block; and generating a reconstructed block on the basis of the prediction block.

In the aforementioned aspect of the present invention, at least one MPM candidate between the first MPM candidate and the second MPM candidate may be determined according to whether a candidate block corresponding to the at least one MPM candidate between the left candidate block and the upper candidate block is located outside a CTB to which the current block belongs.

In addition, if the upper candidate is located outside the CTB to which the current block belongs, the determining of the first MPM candidate may further includes assigning a specific intra prediction mode to the upper candidate block, and determining the intra prediction mode assigned to the upper candidate block as the first MPM candidate.

In addition, the specific intra prediction mode may be a DC mode.

In addition, in the determining of the first MPM candidate, if the left candidate block is located outside a current picture to which the current block belongs, the first MPM candidate may be determined to a DC mode, and in the determining of the second MPM candidate, if the upper candidate block is located outside the current picture, the second MPM candidate may be determined to the DC mode.

In addition, in the determining of the first MPM candidate, if the left candidate block is located outside a current slice to which the current block belongs, the first MPM candidate may be determined to a DC mode, and in the determining of the second MPM candidate, if the upper candidate block is located outside the current slice, the second MPM candidate may be determined to the DC mode.

In addition, in the determining of the first MPM candidate, if a prediction mode of the left candidate block is not an intra mode, the first MPM candidate may be determined to a DC mode, and in the determining of the second MPM candidate, if a prediction mode of the upper candidate block is not the intra mode, the second MPM candidate may be determined to the DC mode.

According to another aspect of the present invention, an image decoding apparatus is provided. The apparatus includes: an intra predictor for determining an intra prediction mode of a current block and performing an intra prediction on the current block on the basis of the determined intra prediction mode, so as to generate a prediction block corresponding to the current block; and a reconstructed block generator for generating a reconstructed block on the basis of the prediction block. Herein, the intra predictor may determine a first MPM candidate corresponding to a left candidate block on the basis of a location of the left candidate block adjacent to a left side of the current block, and determine a second MPM candidate corresponding to an upper candidate block on the basis of a location of the upper candidate block adjacent to an upper portion of the current block generates an MPM candidate list including a plurality of MPM candidates on the basis of the first MPM candidate and the second MPM candidate, and determine one MPM candidate as an intra prediction mode of the current block among a plurality of MPM candidates constituting the MPM candidate list.

Advantageous Effects

An image coding method according to the present invention can improve an image coding/decoding efficiency.

An image decoding method according to the present invention can improve an image coding/decoding efficiency.

An intra prediction method according to the present invention can improve an image coding/decoding efficiency.

An intra prediction mode deriving method of the present invention can improve an image coding/decoding efficiency.

MODE FOR INVENTION

Figure 1:
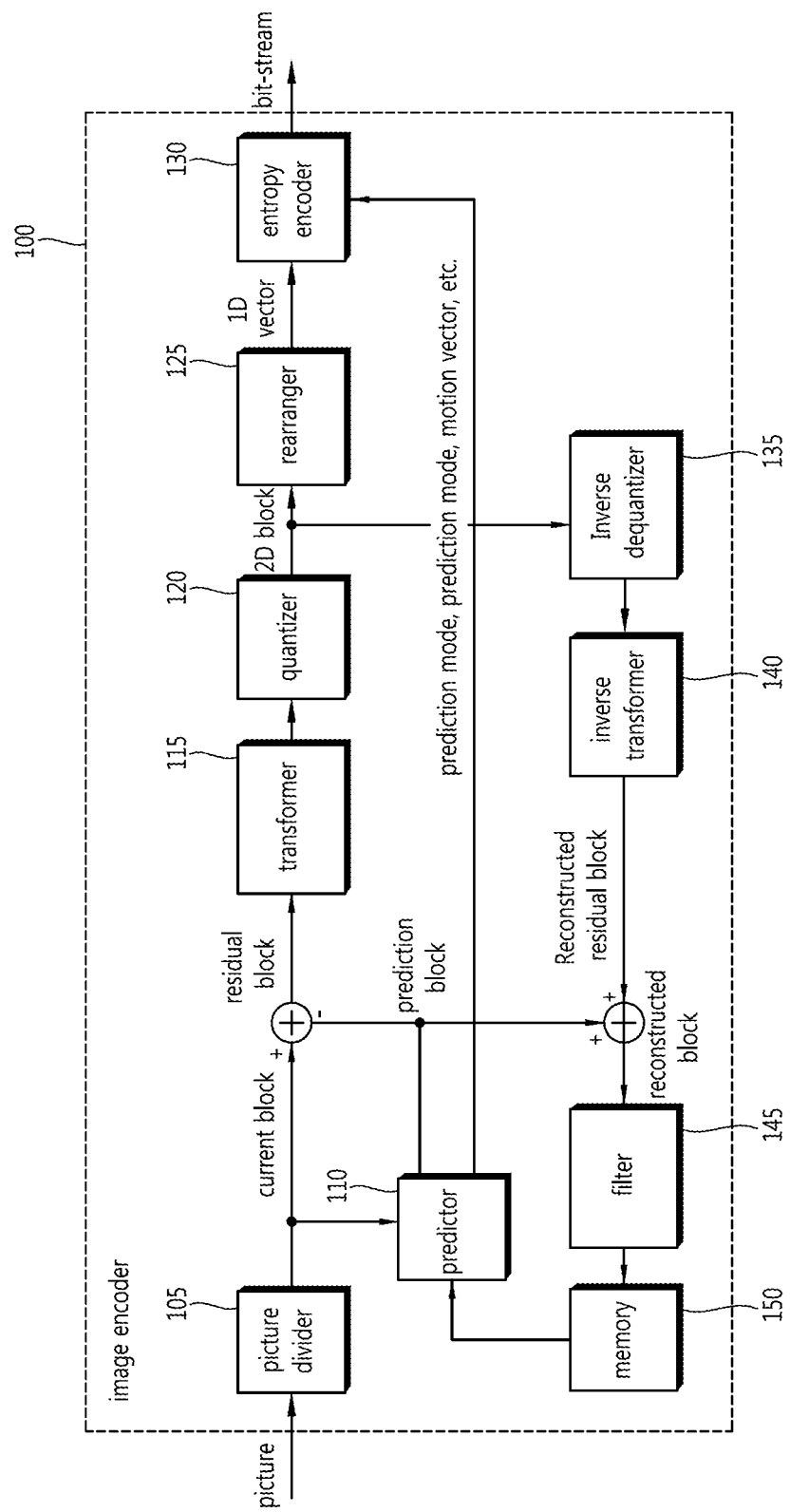
FIG. 1 is a block diagram of an image encoder according to an embodiment of the present invention.

Since the present invention may have various modifications and diverse embodiments, only specific embodiments are exemplarily illustrated in the drawings and will be described in detail. However, the present invention should not be construed as being limited to the specific embodiments set forth herein. The terminology used herein is for the purpose of describing particular embodiments only and is not intended to be limiting of the invention. As used herein, the singular forms are intended to include the plural forms as well, unless the context clearly indicates otherwise. In the present application, it is to be understood that the terms such as "including" or "having", etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Meanwhile, respective constructions in the drawings described in the present invention are illustrated independently for convenience of explanation regarding different particular functions in an image encoder/decoder, and it does not imply that the respective constructions are implemented with separate hardware entities or separate software entities. For example, among the respective constructions, two or more constructions may be combined into one construction, and one construction may be divided into a plurality of constructions. Embodiments in which the respective constructions are integrated and/or separated are also included in the scope of the present invention as long as not departing from the spirit of the invention.

In addition, some constitutional elements may be not essential constitutional elements for performing intrinsic functions but selective constitutional elements for improving only performance. The present invention may be implemented by including only the essential constitutional elements for implementing the spirit of the present invention except for the constitutional elements used to improve only performance. A structure in which only the essential constitutional elements are included except for the selective constitutional elements used for improving only performance is also included in the scope of the present invention.

Hereinafter, embodiments of the present invention will be described in detail with reference to the accompanying drawings. In addition, like reference numerals are used to indicate like elements throughout the drawings, and the same descriptions on the like elements will be omitted.

FIG. 1 is a block diagram of an image encoder according to an embodiment of the present invention. Referring to FIG. 1, an image encoder 100 includes a picture divider 105, a predictor 110, a transformer 115, a quantizer 120, a rearranger 125, an entropy encoder 130, a dequantizer 135, an inverse transformer 140, a filter 145, and a memory 150.

The picture divider 105 may divide an input picture on the basis of at least one processing unit. In this case, the processing unit may be a prediction unit (PU), a transform unit (TU), or a coding unit (CU).

The predictor 110, as described below, may include an inter predictor which performs an inter prediction and an intra predictor which performs an intra prediction. The predictor 110 may generate a prediction block by performing a prediction for a processing unit of a picture in the picture divider 105. The processing unit of the picture in the predictor 100 may be a CU, a TU, or a PU. In addition, it is determined whether a prediction performed for a corresponding processing unit is an inter prediction or an intra prediction, and a specific content (e.g., a prediction mode, etc.) of each prediction method may be determined. In this case, the processing unit for performing a prediction may differ from the processing unit for determining the specific content. For example, a prediction method, a prediction mode, etc., may be determined in a unit of PU, and the prediction may be performed in a unit of TU. A residual value (i.e., residual block) between a generated prediction block and an original block may be input to the transformer 115. In addition, prediction mode information used for the prediction, motion vector information, etc., may be coded in the entropy encoder 130 together with the residual value and may be delivered to a decoder.

The transformer 115 transforms the residual block on the basis of a transform unit, and generates a transform coefficient. The transform unit of the transformer 115 may be a TU, and may have a quad tree structure. In this case, a size of the transform unit may be determined in a range of a specific maximum or minimum size. The transformer 115 may transform the residual block by using discrete cosine transform (DCT) and/or discrete sine transform (DST).

The quantizer 120 may generate a quantization coefficient by quantizing residual values transformed in the transformer 115. A value calculated by the quantizer 120 may be provided to the dequantizer 135 and the rearranger 125.

The rearranger 125 may re-sort the quantization coefficient provided from the quantizer 120. The re-sorting of the quantization coefficient may increase coding efficiency in the entropy encoder 130. The rearranger 125 may re-sort quantization coefficients having a form of a 2-dimensional dimensional block into a 1-dimensional vector form by using a coefficient scanning method. The rearranger 125 may change an order of coefficient scanning on the basis of a probabilistic statistics of coefficients transmitted from the quantizer, thereby increasing an entropy encoding efficiency in the entropy encoder 130.

The entropy encoder 130 may perform entropy encoding with respect to the quantization coefficients re-sorted by the rearranger 125. The entropy encoder 130 may code a variety of information delivered from the rearranger 125 and the predictor 110. The information may include coding unit's quantization coefficient information and block type information, prediction mode information, division unit information, prediction unit information and transmission unit information, motion vector information, reference picture information, block's interpolation information, filtering information, etc.

The entropy encoding may use Exponential Golomb, CAVLC(Context-Adaptive Variable Length Coding), and/or CABAC(Context-Adaptive Binary Arithmetic Coding). For example, a table for performing the entropy encoding, such as a variable length coding (VLC) table, may be stored in the entropy encoder 130. The entropy encoder 130 may perform the entropy encoding by using the stored VLC table. For another example, in the CABAC entropy encoding method, the entropy encoder 130 may convert a symbol into a binary form, i.e., a bin, and thus may generate a bit-stream by performing arithmetic encoding on the bin according to a bit generation probability.

When the entropy encoding is applied, an index having a high value and its corresponding short codeword may be assigned to a symbol having a high generation probability, and an index having a high value and its corresponding long codeword may be assigned to a symbol having a low generation probability. Accordingly, a bit amount for symbols to be coded may be decreased, and an image compression performance may be improved by the entropy encoding.

The dequantizer 135 may dequantize values quantized by the quantizer 120. The inverse transformer 140 may inverse-transform values dequantized by the dequantizer 135. Residual values generated in the dequantizer 135 and the inverse transformer 140 may be combined with a prediction block predicted by the predictor 110, and thus a reconstructed block may be generated.

The filter 145 may apply an in-loop filter to the reconstructed block and/or picture. The in-loop filter may include a deblocking filter, a sample adaptive offset (SAO), and/or an adaptive loop filter (ALF), etc.

The deblocking filter may remove block distortion which occurs at a boundary between blocks in the reconstructed picture. The SAO may add a proper offset value to a pixel value to compensate for a coding error. The ALF may perform filtering on the basis of a value used to compare an original image with an image reconstructed after filtering a block through the deblocking filter.

Meanwhile, regarding the reconstructed block used in the intra prediction, the filter 145 may not apply the filtering.

The memory 150 may store the reconstructed block or picture calculated by using the filter 145. The reconstructed block or picture stored in the memory 150 may be provided to the predictor 110 for performing the inter prediction.

Figure 2:
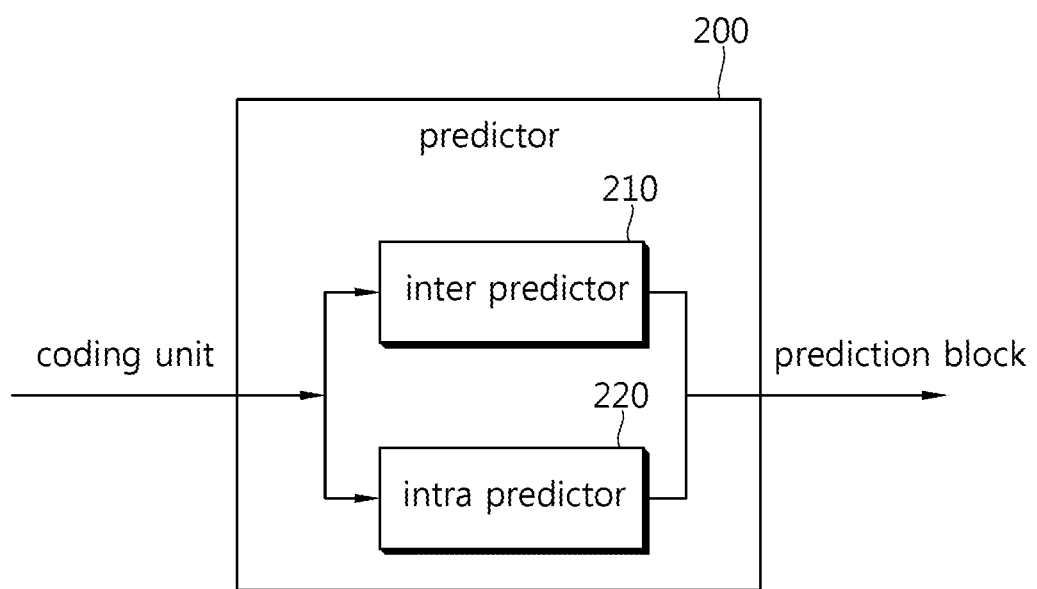
FIG. 2 is a schematic view showing the concept of a predictor according to an embodiment of the present invention.

FIG. 2 is a schematic view showing the concept of a predictor according to an embodiment of the present invention. Referring to FIG. 2, a predictor 200 may include an inter predictor 210 and an intra predictor 220.

The inter predictor 210 may generate a prediction block by performing a prediction on the basis of information of either a previous picture or a next picture of a current picture. Regarding a prediction unit (PU), the inter predictor 210 may select a reference picture, and may select a reference block having the same size as the PU as a pixel sample unit. Subsequently, the inter predictor 210 may generate a prediction block which is a sample unit (e.g., a ½ pixel sample unit and a ¼ pixel sample unit) smaller than an integer unit and thus is the most similar to a current PU and of which a residual signal can be minimized and a motion vector to be coded can also be minimized. In this case, the motion vector may be expressed in a unit smaller than an integer pixel.

In addition, the intra predictor 220 may generate the prediction block by performing the prediction on the basis of pixel information in the current picture. In this case, regarding the PU, the intra predictor 220 may determine an intra prediction mode and may perform a prediction on the basis of the determined intra prediction mode.

An index of the reference picture selected by the inter predictor 210, information on the motion vector, and information on the intra prediction mode selected by the intra predictor 220 may be coded and delivered to the decoder.

Figure 3:
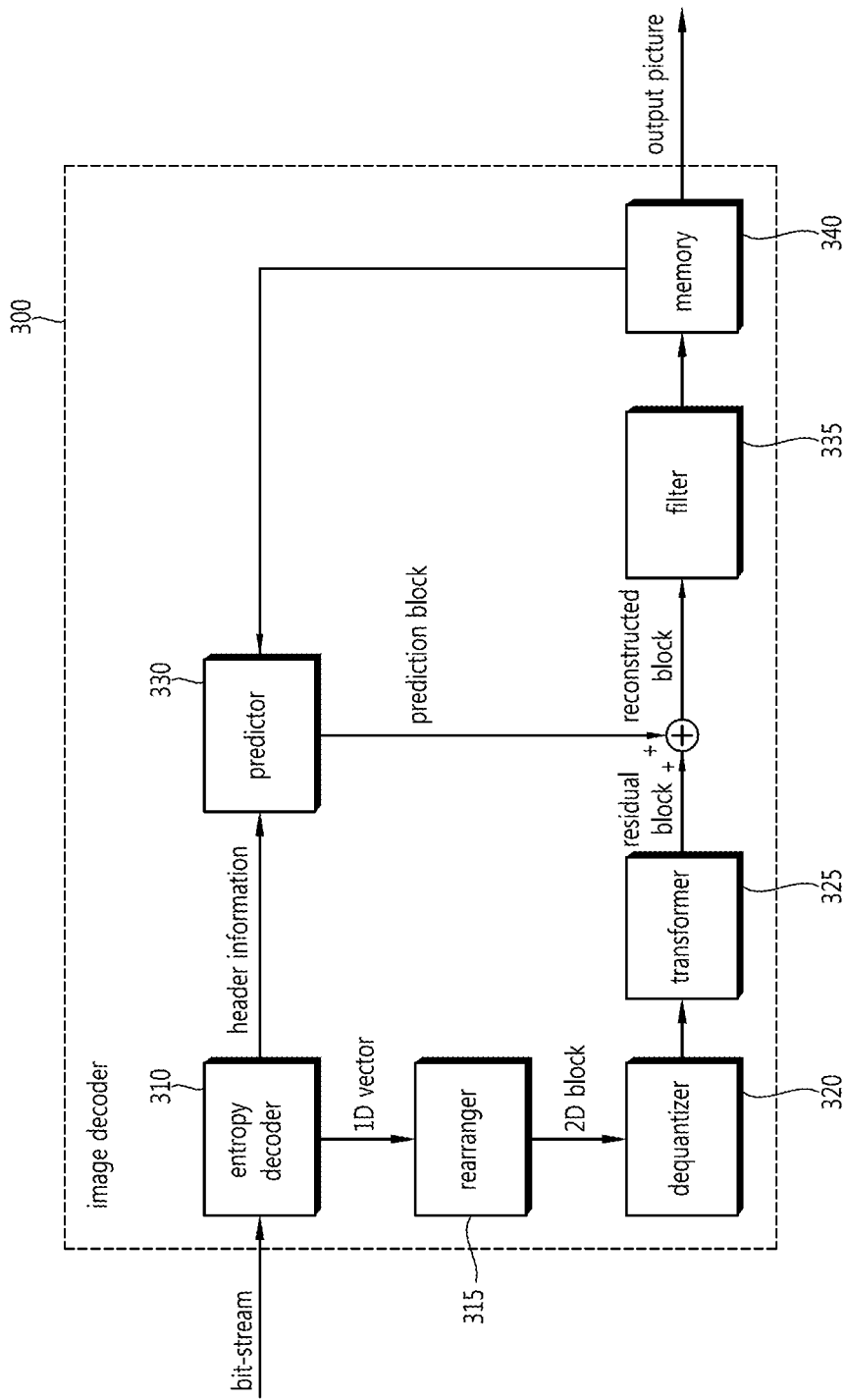
FIG. 3 is a block diagram of an image decoder according to an embodiment of the present invention.

FIG. 3 is a block diagram of an image decoder according to an embodiment of the present invention. Referring to FIG. 3, an image decoder 300 may include an entropy decoder 310, a rearranger 315, a dequantizer 320, an inverse transformer 325, a predictor 330, a filter 335, and a memory 340.

When an image bit-stream is input to the image decoder, the input bit-stream may be decoded according to an operation of processing image information in an image encoder.

The entropy decoder 310 may perform entropy decoding on the input bit-stream. An entropy decoding method is similar to the aforementioned entropy encoding method. When the entropy decoding is applied, an index having a high value and its corresponding short codeword may be assigned to a symbol having a high generation probability, and an index having a high value and its corresponding long codeword may be assigned to a symbol having a low generation probability. Accordingly, a bit amount for symbols to be coded may be decreased, and an image compression performance may be improved by the entropy encoding.

Among a plurality of pieces of information decoded by the entropy decoder 310, information for generating a prediction block may be provided to the predictor 330, and a residual value subjected to entropy decoding in the entropy decoder may be input to the rearranger 315.

The rearranger 315 may re-sort the bit-stream subjected to the entropy decoding in the entropy decoder 310 according to a re-sorting method used in an image encoder. The rearranger 315 may perform the re-sorting by reconstructing coefficients expressed in a 1-dimensional vector format into coefficients of a 2-dimensional block form. The rearranger 315 may receive information related to coefficient scanning performed in the encoder and may perform re-sorting by using an inverse scanning method on the basis of an order of scanning performed in the encoder.

The dequantizer 320 may perform dequantization on the basis of a quantization parameter provided from the encoder and a coefficient value of a re-sorted block.

According to a result of quantization performed by the image encoder, the inverse transformer 325 may perform inverse DCT and/or inverse DST with respect to DCT and DST performed by the transformer of the encoder. The inverse transformation may be performed based on a determined transmission unit or an image division unit. The transformer of the encoder may selectively perform the DCT and/or the DST according to a plurality of pieces of information such as a prediction method, a current block size, and/or a prediction direction, etc. The inverse transformer 325 of a decoder may perform inverse transformation on the basis of information on transformation performed in the transformer of the encoder.

The predictor 330 may generate a prediction block on the basis of prediction block generation-related information provided from the entropy decoder 310 and previously decoded block and/or picture information provided from the memory 340. A reconstructed block may be generated by using a prediction block generated from the predictor 330 and a residual block provided from the inverse transformer 325.

The reconstructed block and/or picture may be provided to the filter 335. The filter 335 may apply an in-loop filter to the reconstructed block and/or picture. The in-loop filter may include a deblocking filter, a sample adaptive offset (SAO), and/or an adaptive loop filter (ALF), etc.

The memory 340 may store the reconstructed picture or block so as to be used as a reference picture or a reference block, or may provide the reconstructed picture to an output element.

Figure 4:
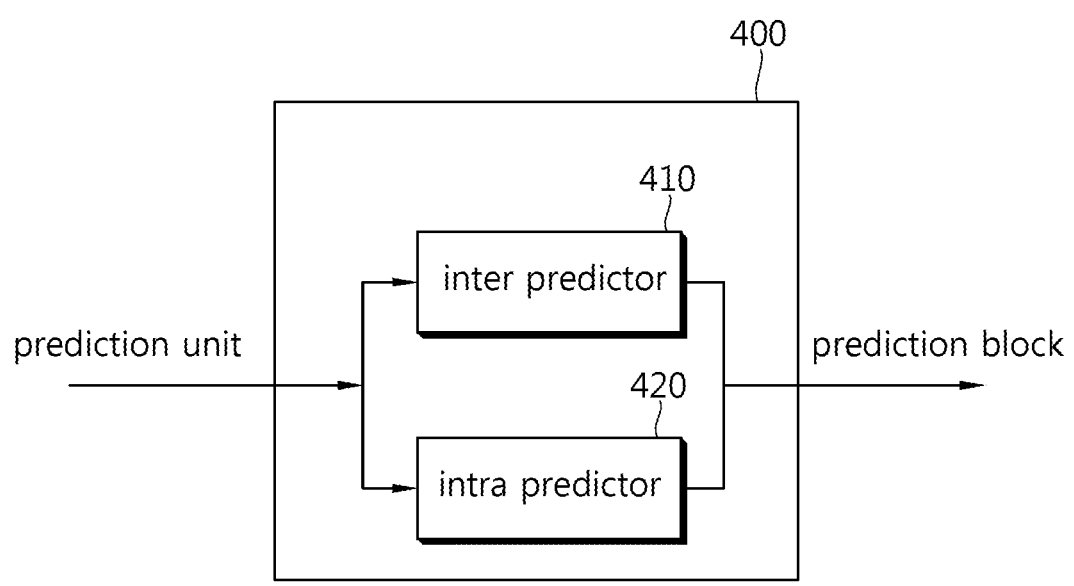
FIG. 4 is a schematic view showing the concept of a predictor of an image decoder according to an embodiment of the present invention.

FIG. 4 is a schematic view showing the concept of a predictor of an image decoder according to an embodiment of the present invention.

Referring to FIG. 4, a predictor 400 may include an inter predictor 410 and an intra predictor 420.

If a prediction mode for the PU is an inter prediction mode, the inter predictor 410 may use information required for the inter prediction of the current PU provided from the image encoder, for example, information regarding a motion vector, a reference picture index, etc., to perform an inter prediction on the current PU on the basis of information included in at least one of previous and next pictures of the current picture in which the current PU is included. In this case, if a skip flag, merge flag, or the like of a coding unit (CU) received from the encoder is confirmed, the motion information may be derived in accordance therewith.

The intra predictor 420 may generate a prediction block on the basis of pixel information in a current picture, when a prediction mode for a corresponding PU is an intra prediction mode. In this case, regarding the PU, the intra predictor 420 may determine an intra prediction mode and may perform a prediction on the basis of the determined intra prediction mode. Herein, if the intra prediction mode related information received from an encoder is confirmed, the intra prediction mode may be derived in accordance therewith.

Hereinafter, if an "image" or a "screen" can be used for the same meaning as a "picture" according to a configuration or expression of the present invention, the "picture" can also be referred to as the "image" or the "screen".

Figure 5:
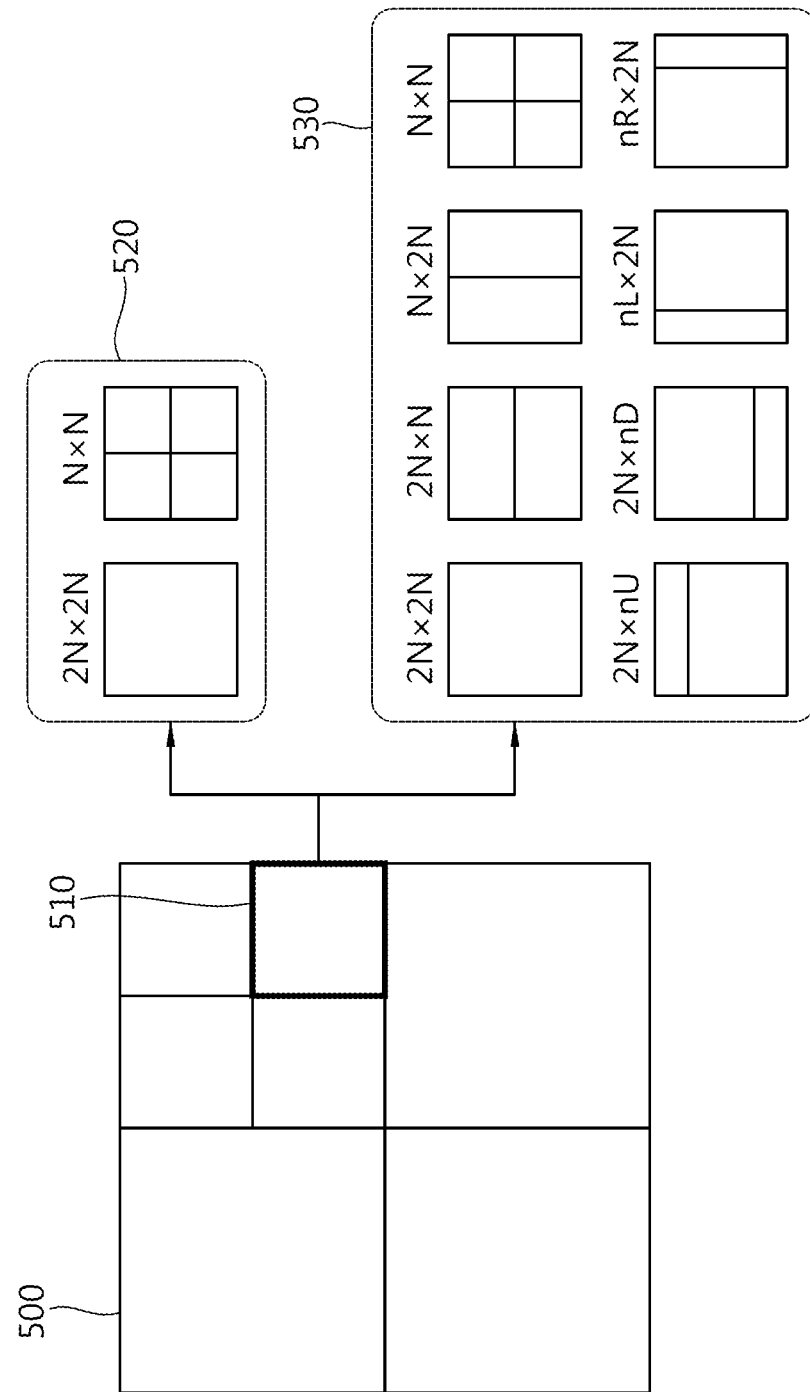
FIG. 5 is a schematic view showing the concept of an example of a quad tree structure of a processing unit in a system according to the present invention.

FIG. 5 is a schematic view showing the concept of an example of a quad tree structure of a processing unit in a system according to the present invention.

A coding unit (CU) may imply a unit of performing coding/decoding of a picture. One coding block in a picture to be coded may have a depth based on a quad tree structure and may be partitioned repetitively. In this case, a coding block which is no longer partitioned may correspond to the CU, and an encoder may perform a coding process for the CU. A size of the CU may be various, such as 64×64, 32×32, 16×16, 8×8, etc.

Herein, the coding block which is partitioned repetitively based on the quad tree structure may be called a coding tree block (CTB). One CTB may not be further partitioned, and in this case, the CTB itself may correspond to one CU. Therefore, the CTB may correspond to a largest coding unit (LCU) which is a CU having a maximum size. Meanwhile, a CU having a minimum size in the CTB may be called a smallest coding unit (SCU).

Referring to FIG. 5, through the partitioning, a CTB 500 may have a hierarchical structure consisting of a smaller CU 510. The hierarchical structure of the CTB 500 may be specified based on size information, depth information, partition flag information, etc. The information regarding a size of the CTB, the partition depth information, the partition flag information, etc., may be transmitted from an encoder to a decoder by being included in a sequence parameter set (SPS) on a bit-stream.

Meanwhile, which prediction will be performed between the inter prediction and the intra prediction may be determined in a unit of CU. If the inter prediction is performed, an inter prediction mode, motion information, etc., may be determined in a unit of PU, and if the intra prediction is performed, an intra prediction mode may be determined in a unit of PU. In this case, as described above, a processing unit by which the prediction is performed may be the same as a processing unit by which a prediction method and its specific content are determined, or the two units may be different. For example, the prediction method, the prediction mode, etc., may be determined in a unit of PU, and the prediction may be performed in a unit of transform unit (TU).

Referring to FIG. 5, one CU 510 may be used as one PU or may be partitioned into a plurality of PUs. In case of an intra prediction 520, a partitioning mode of a CU (and/or PU) may be a 2N×2N or N×N mode (where N is an integer). Herein, the PU in the 2N×2N mode may have a size of 2N×2N, and the PU in the N×N mode may have a size of N×N. In case of an inter prediction 530, a partitioning mode of a CU (and/or PU) may be a 2N×2N, 2N×N, N×2N, N×N, 2N×nU, 2N×nD, nL×2N or nR×2N mode (where N is an integer). Herein, the PU in the 2N×N mode may have a size of 2N×N, and the PU in the N×2N mode may have a size of N×2N. In addition, in the 2N×nU mode, one CU may be partitioned into a PU having a size of 2N×(1/2)N and a PU having a size of 2N×(3/2)N. In this case, the PU having the size of 2N×(1/2)N may be located in an upper portion of the PU having the size of 2N×(3/2)N. In the 2N×nD mode, one CU may be partitioned into a PU having a size of 2N×(3/2)N and a PU having a size of 2N×(1/2)N. In this case, the PU having the size of 2N×(1/2)N may be located in a lower portion of the PU having the size of 2N×(3/2)N. In addition, in the nL×2N mode, one CU may be partitioned into a PU having a size of (1/2)N×2N and a PU having a size of (3/2)N×2N. In this case, the PU having the size of (1/2)N×2N may be located in a left side of the PU having the size of (3/2)N×2N. In the nR×2N mode, one CU may be partitioned into a PU having a size of (3/2)N×2N and a PU having a size of (1/2)N×2N. In this case, the PU having the size of (1/2)N×2N may be located in a right side of the PU having the size of (3/2)N×2N.

The aforementioned partitioning mode is only for one embodiment, and thus the method of partitioning the CU into the PU is not limited to the aforementioned embodiment. For example, in case of the inter prediction 530, the partitioning mode of the CU (and/or PU) may use only four types of mode, i.e., 2N×2N, 2N×N, N×2N, and N×N, and another partitioning mode may be further used in addition to the aforementioned 8 types of partitioning mode.

Hereinafter, in the present invention, a current block is a block for which a coding, decoding, and/or prediction process is performed at present, and may imply a block corresponding to a processing unit when the coding, decoding, and/or prediction process is performed. For example, if the prediction process is performed on the current block, the current block may correspond to a to-be-predicted block corresponding to a current PU. In addition, in the present invention, a block generated by the prediction is called a prediction block.

A 'unit' implies a processing unit when the coding, decoding, etc., is performed, and thus may be distinguished from a 'block' indicating a group of pixels and/or samples. However, for convenience of explanation, the 'unit' may optionally refer to the 'block' corresponding to the 'unit' in the present invention. For example, hereinafter, in the present invention, a to-be-predicted block corresponding to one PU may be referred to as a PU, and a block to be coded/decoded and corresponding to one CU may be referred to as a CU. Such a distinction will be clearly understood by those ordinarily skilled in the art.

Meanwhile, as described above in the embodiments of FIG. 2 and FIG. 4, the intra predictor may perform a prediction on the basis of pixel information in a current picture and thus may generate a prediction block for a current block. For example, the intra predictor may predict a pixel value in the current block by using pixels in a reconstructed block located in an upper, left, left upper, and/or right upper portion adjacent the current block.

The intra prediction mode may be a vertical mode, a horizontal mode, a DC mode, a planar mode, an angular mode, etc., according to a location and/or prediction scheme, etc., of reference pixels used to predict a pixel value of a current block. In the vertical mode, a prediction may be performed in a vertical direction by using a pixel value of a neighboring block. In the horizontal mode, a prediction may be performed in a horizontal direction by using the pixel value of the neighboring block. In addition, in the DC mode, pixel values in the current block may be predicted by using an average of pixel values around the current block. In the planar mode, a prediction value of a to-be-predicted pixel located in the current block may be derived by a specific computation on the basis of a pixel value of a plurality of pixels located adjacent the current block. In this case, the plurality of pixels used to predict the to-be-predicted pixel may be determined differently according to a location of the to-be-predicted pixel. In the angular mode, a prediction may be performed according to a predetermined angle and/or direction with respect to each mode.

The intra predictor may use a predetermined prediction direction and prediction mode value to perform an intra prediction. In this case, for example, the number of intra prediction modes assignable to the current block may differ according to a size of the current block. Table 1 below shows an embodiment of the number of intra prediction modes assignable to the current block (and/or PU) according to a size of the current block (and/or PU).

TABLE 1

| PU size | The number of modes |
|---|---|
| 4 × 4 | 18 |
| 8 × 8 | 35 |
| 16 × 16 | 35 |
| 32 × 32 | 35 |
| 64 × 64 | 4 |

For another example, the number of intra prediction modes assignable to the current block may be a specific fixed value. For example, the number of intra prediction modes assignable to the current block may be 35. In this case, the 35 intra prediction modes may include the aforementioned DC, planar, vertical, horizontal, angular mode, etc.

As described above, after determining the intra prediction mode, the encoder may encode information on the determined intra prediction mode and then transmit it to the decoder. Although the intra prediction mode information can be transmitted as a value itself for indicating its prediction mode, it is also possible to provide a method of transmitting the intra prediction mode information based on a mode value predicted for an intra prediction mode to increase a transmission efficiency. Hereinafter, a prediction mode used as a prediction value for an intra prediction mode of a current block is called a most probable mode (MPM) in the present invention.

Figure 6:
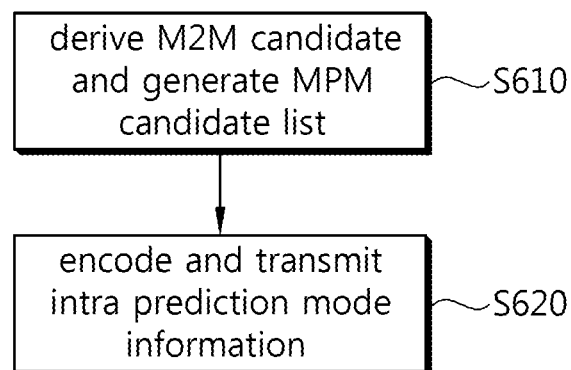
FIG. 6 is a flowchart showing a method of transmitting intra prediction mode information according to an embodiment of the present invention.

FIG. 6 is a flowchart showing a method of transmitting intra prediction mode information according to an embodiment of the present invention.

Referring to FIG. 6, an encoder may derive a plurality of MPM candidates constituting an MPM candidate list on the basis of a plurality of neighboring blocks adjacent to a current block (S610).

The encoder may derive the plurality of MPM candidates on the basis of the plurality of neighboring blocks, and may generate the MPM candidate list by allocating the MPM candidate to the MPM candidate list. In this case, the encoder may use an intra prediction mode of the neighboring block directly as the MPM candidate corresponding to the neighboring block, or may use a particular intra prediction mode determined according to a specific condition as the MPM candidate corresponding to the neighboring block.

Meanwhile, the encoder may use a specific fixed number of MPM candidates to encode the intra prediction mode. In this case, the number of MPM candidates included in the MPM candidate list may be equal to the specific fixed number. For example, the number of MPM candidates constituting the MPM candidate list may be 3. Hereinafter, it is assumed in the present invention that the number of MPM candidates constituting the MPM candidate list is 3, for convenience of explanation.

In this case, the number of neighboring blocks used to derive the MPM candidate may be less than the number of PMP candidates constituting the MPM candidate list. For example, if the number of neighboring blocks used to derive the MPM candidate is 2, the number of MPM candidates derived in accordance with the neighboring block may be 2. In this case, since the number of MPM candidates constituting the MPM candidate list is fixed to 3, the encoder may determine an additional MPM candidate and may allocate it to the MPM candidate list. Herein, the MPM candidate additionally derived may be selected during an intra prediction mode except for the MPM candidate derived in accordance with the neighboring block.

A detailed embodiment of a method of deriving an MPM candidate based on a prediction mode of a neighboring block will be described below.

Referring back to FIG. 6, the encoder may encode intra prediction mode information based on the MPM candidate list and may transmit it to the decoder (S620).

The encoder may generate MPM flag information by determining whether the same MPM candidate as the intra prediction mode of the current block exists among the plurality of MPM candidates constituting the MPM candidate list, that is, whether the prediction value of the intra prediction mode is used directly as the intra prediction mode of the current block. Herein, an MPM flag may correspond to a flag indicating whether the identical MPM candidate as the intra prediction mode of the current block exists among the plurality of MPM candidates constituting the MPM candidate list, and may be denoted by prev_intra_luma_pred_flag for example. The generated MPM flag information may be encoded by an entropy encoder of the encoder and then may be transmitted to a decoder.

If the identical MPM candidate as the intra prediction mode of the current block exists in the current block list, the encoder may generate MPM index information indicating which candidate is the same as the intra prediction mode of the current block among the plurality of MPM candidates constituting the MPM candidate list. For example, the MPM index information may be denoted by mpm_idx. In this case, the generated MPM index information may be encoded by the entropy encoder of the encoder and then may be transmitted to the decoder.

If the identical MPM candidate as the intra prediction mode of the current block does not exist in the MPM candidate list, the encoder may derive a remaining mode corresponding to the intra prediction mode of the current block, on the basis of the plurality of MPM candidates constituting the MPM candidate list and the intra prediction mode of the current block. In this case, a mode value of the derived remaining mode may be encoded by the entropy encoder of the encoder and then may be transmitted to the decoder.

Figure 7:
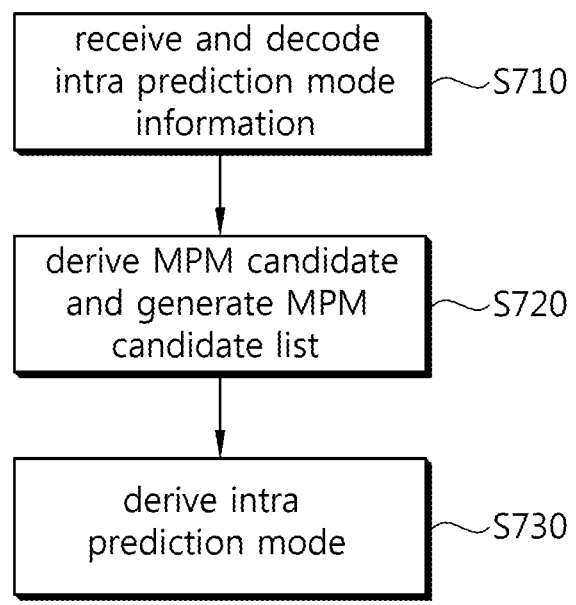
FIG. 7 is a flowchart showing a method of deriving an intra prediction mode according to an embodiment of the present invention.

FIG. 7 is a flowchart showing a method of deriving an intra prediction mode according to an embodiment of the present invention.

Referring to FIG. 7, a decoder may perform decoding by receiving intra prediction mode information from an encoder (S710). The decoding process may be performed by an entropy encoder of the decoder. The intra prediction mode information received from the encoder may be MPM flag information, MPM index information, remaining mode information, etc.

Referring back to FIG. 7, the decoder may derive the plurality of MPM candidates constituting the MPM candidate list on the basis of a plurality of neighboring blocks adjacent to the current block (S720). That is, the decoder may derive the plurality of MPM candidates on the basis of the plurality of neighboring blocks, and may generate the MPM candidate list by allocating the MPM candidate to the MPM candidate list. A detailed embodiment of a method of deriving an MPM candidate on the basis of a prediction mode of a neighboring block is described below.

Referring back to FIG. 7, the decoder may derive the intra prediction mode of the current block on the basis of the MPM candidate list and the intra prediction mode information (S730).

The decoder may determine whether the identical MPM candidate as the prediction mode of the current block exists among the plurality of MPM candidates constituting the MPM candidate list on the basis of the MPM flag information received from the encoder.

If the identical MPM candidate as the prediction mode of the current block exists in the MPM candidate list, the decoder may determine an MPM candidate indicated by the MPM index information to the intra prediction mode of the current block. Since the MPM index information is described above with reference to FIG. 6, a detailed description on the MPM index information will be omitted herein. If the same MPM candidate as the prediction mode of the current block does not exist in the MPM candidate list, the decoder may derive the intra prediction mode of the current block on the basis of the MPM list and the remaining mode received from the encoder.

When the intra prediction mode of the current block is derived, the decoder may generate a prediction block corresponding to the current block by performing an intra prediction on the current block on the basis of the derived intra prediction mode.

Figure 8:
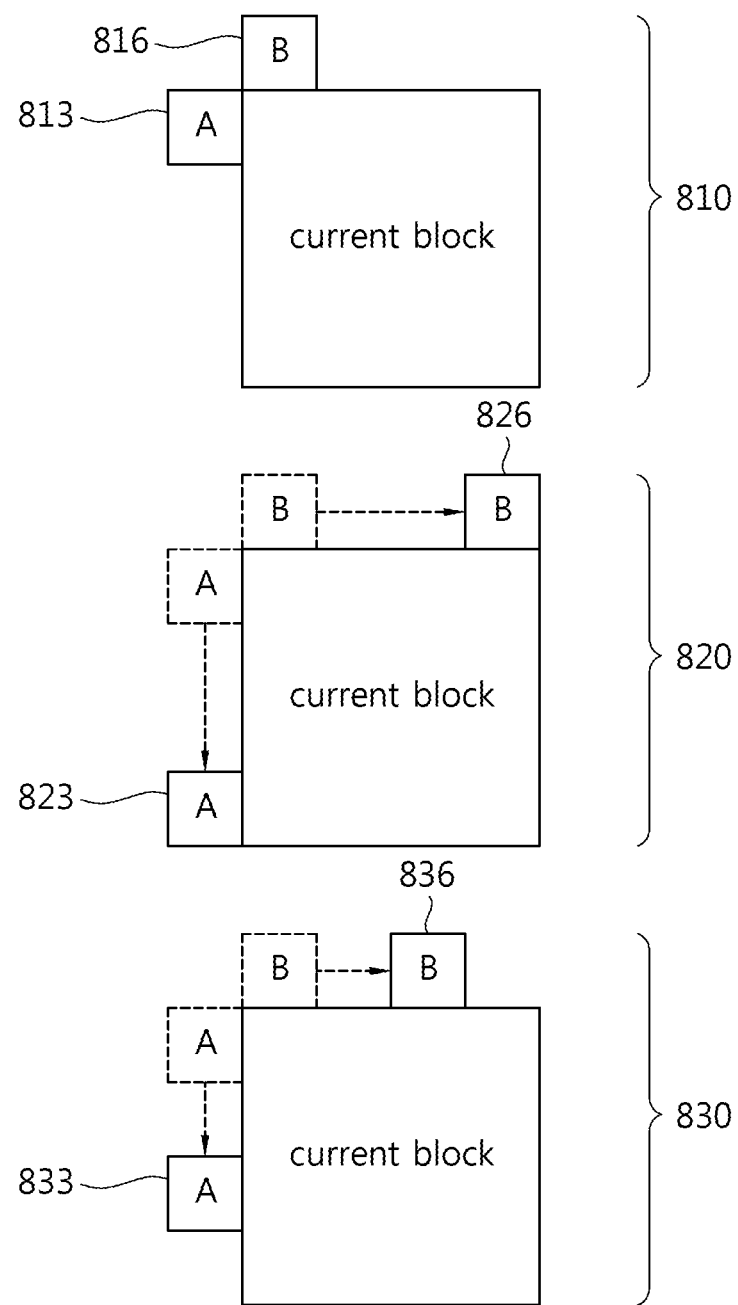
FIG. 8 is a schematic view showing an embodiment of a neighboring block used to derive a most probable mode (MPM) candidate.

FIG. 8 is a schematic view showing an embodiment of a neighboring block used to derive an MPM candidate. In the embodiment of FIG. 8, a current block and neighboring blocks adjacent to the current block may be respective blocks corresponding to one PU.

Referring to 810 of FIG. 8, an intra predictor may derive MPM candidates corresponding to the current block on the basis of a block A 813 located in an uppermost portion among left neighboring blocks located to a left side of the current block and a block B 816 located in a leftmost side among upper neighboring blocks adjacent to an upper side of the current block. In this case, an MPM candidate corresponding to the block A 813 (hereinafter, called an MPM candidate A) may be determined to an intra prediction mode of the block A 813, and an MPM candidate corresponding to the block B 816 (hereinafter, called an MPM candidate B) may be determined to an intra prediction mode of the block B 816. However, if a neighboring block (i.e., the block A and/or the block B) is unavailable or satisfies a different specific condition, an MPM candidate corresponding to the neighboring block (i.e., the block A and/or the block B) may be determined to a specific intra prediction mode. A detailed embodiment thereof will be described below.

Meanwhile, as described above, the number of intra prediction modes assignable to the current block may differ depending on a size of the current block. In this case, a mode value of the intra prediction mode assigned to the neighboring block (i.e., the block A and/or the block B) may be greater than a maximum mode value assignable to the current block. In this case, the intra predictor may map the intra prediction mode value of the neighboring block (i.e., the block A and/or the block B) to a mode value assignable to the current block, and thereafter may determine an intra prediction mode corresponding to the mapped mode value to an MPM candidate corresponding to the neighboring block (i.e., the block A and/or the block B). A method of mapping the intra prediction mode value of the neighboring block to the mode value assignable to the current block may be shown by Table 2 below as one embodiment.

TABLE 2

| value | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mapIntraPredMode3[value] | 0 | 1 | 2 | 3 | 3 | 3 | 1 | 3 | 2 | 2 | 3 | 3 | 1 | 1 | 3 | 3 | 2 | 2 |
| mapIntraPredMode9[value] | 0 | 1 | 2 | 3 | 4 | 5 | 6 | 7 | 8 | 9 | 3 | 3 | 3 | 3 | 3 | 3 | 3 | 3 |

| value | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| mapIntraPredMode3[value] | 3 | 3 | 3 | 3 | 1 | 1 | 1 | 3 | 3 | 3 | 3 | 2 | 2 | 2 | 2 | 3 | 3 |
| mapIntraPredMode9[value] | 3 | 4 | 5 | 5 | 1 | 1 | 6 | 6 | 7 | 4 | 8 | 8 | 2 | 2 | 9 | 9 | 3 |

In the embodiment of Table 2, 'value' indicates an intra prediction mode value of a neighboring block. In addition, if a size of the neighboring block is the same or identical to a size of the current block and if the number of intra prediction modes assignable to the current block is 4, mapIntraPredMode3 [value] may indicate a mode value to which the intra prediction mode of the neighboring block is mapped. If the size of the neighboring block is the same or identical to a size of the current block and if the number of intra prediction modes assignable to the current block is 18 or 35, mapIntraPredMode9[value] may indicate a mode value to which the intra prediction mode of the neighboring block is mapped.

For example, if the size of the current block is 64×64, the number of intra prediction modes assignable to the current block may be 4 (e.g., an intra prediction mode having a mode value in the range of 0 to 3). In this case, if the intra prediction mode value of the neighboring block exceeds 3, the intra predictor may map the intra prediction mode value of the neighboring block to a mode value less than or equal to 3 (i.e., mapIntraPredMode3 [value]) as in the embodiment of Table 2, and thereafter may use the mapped mode value as an MPM candidate corresponding to the neighboring block. For another example, if the size of the current block is 4×4, the number of intra prediction modes assignable to the current block may be 18 (e.g., an intra prediction mode having a mode value in the range of 0 to 17). In this case, if an intra prediction mode value of a neighboring block exceeds 17, the intra predictor may map the intra prediction mode value of the neighboring block to a mode value less than or equal to 9 (i.e., mapIntraPredMode9[value]) as in the embodiment of Table 2, and thereafter may use the mapped mode value as an MPM candidate corresponding to the neighboring block. For another example, if the number of intra prediction modes assignable to the current block is 18 and if the intra prediction mode value of the neighboring block exceeds 17, the intra predictor may map the intra prediction mode value of the neighboring block to a mode value less than or equal to 17.

Unlike the aforementioned embodiment, if the number of intra prediction modes assignable to the current block is a specific fixed value (i.e., 35), a case where a mode value of an intra prediction mode of a neighboring block (i.e., a block A and/or a block B) is greater than a maximum mode value assignable to the current block may not occur. Therefore, in this case, the intra predictor may not apply the mapping process described through the embodiment of Table 2 in the process of deriving the MPM candidate.

In the embodiment of 810 of FIG. 8, the MPM candidate A corresponding to the block A 813 and the MPM candidate B corresponding to the block B 816 may be derived through the aforementioned process. However, as described above, the number of MPM candidates constituting the MPM candidate list may be fixed to 3. Therefore, the intra predictor may additionally determine two MPM candidates if the MPM candidate A is identical to the MPM candidate B, and may additionally determine one MPM candidate if the MPM candidate A is not identical to the MPM candidate B.

In one embodiment, if the MPM candidate A is identical to the MPM candidate B, an MPM candidate included in an MPM candidate list may be determined as follows. For example, if the MPM candidate A is the planar mode or the DC mode, the intra predictor may determine the planar mode, the DC mode, and the vertical mode as the MPM candidate included in the MPM candidate list. In addition, if the MPM candidate A is neither the planar mode nor the DC mode, the intra predictor may determine the MPM candidate A and two intra prediction modes having the most similar prediction direction as the MPM candidate A as the MPM candidate included in the MPM candidate list.

In addition, if the MPM candidate A is not identical to the MPM candidate B, an additional MPM candidate included in the MPM candidate list may be determined as follows for example. If both of the MPM candidate A and the MPM candidate B are not the planar mode, the planar mode may be determined as the additional MPM candidate. In addition, if one of the MPM candidate A and the MPM candidate B is the planar mode and both of the MPM candidate A and the MPM candidate B are not the DC mode, the DC mode may be determined as the additional MPM candidate. In addition, if one of the MPM candidate A and the MPM candidate B is the planar mode and the other one is the DC mode, the vertical mode may be determined as the additional MPM candidate.

Meanwhile, a location of a neighboring block used to derive the MPM candidate may be determined differently from the embodiment of 810 of FIG. 8. 820 of FIGS. 8 and 830 of FIG. 8 show other embodiments of the neighboring block used to derive the MPM candidate.

For example, referring to 820 of FIG. 8, the intra predictor may derive MPM candidates corresponding to the current block on the basis of a block A 823 located in a lowermost portion among left neighboring blocks located to a left side of the current block and a block B 826 located in a rightmost portion among upper neighboring blocks adjacent to an upper side of the current block. For another example, referring to 830 of FIG. 8, the intra predictor may derive MPM candidates corresponding to the current block on the basis of a block A 833 located in any portion among left neighboring blocks located to a left side of the current block and a block B 836 located in any portion among upper neighboring blocks adjacent to an upper side of the current block. Since a process of deriving the MPM candidate for each case is similar to the embodiment of 810 of FIG. 8, it will be omitted herein.

Hereinafter, for convenience of explanation, it is assumed in the present invention that, as in the embodiment of 810 of FIG. 8, MPM candidates corresponding to a current block are derived on the basis of a block located in an uppermost portion among left neighboring blocks located in a left side of the current block and a block located in a leftmost side among upper neighboring blocks adjacent to an upper portion of the current block. In addition, for convenience of explanation, it is assumed in the present invention that a block located in an uppermost portion among left neighboring blocks adjacent to a left side of the current block is called a left candidate block (and/or a block A), and a block located in a leftmost side among upper neighboring blocks adjacent to an upper portion of the current block is called an upper candidate block (and/or a block B). In addition, the MPM candidate derived in accordance with the block A is called an MPM candidate A, and an MPM candidate derived in accordance with the block B is called an MPM candidate B. However, embodiments derived below are not limited thereto, and may also equally or similarly apply to a case where a location of a neighboring block used to derive the MPM candidate is different from that of the embodiment of 810 of FIG. 8.

Figure 9:
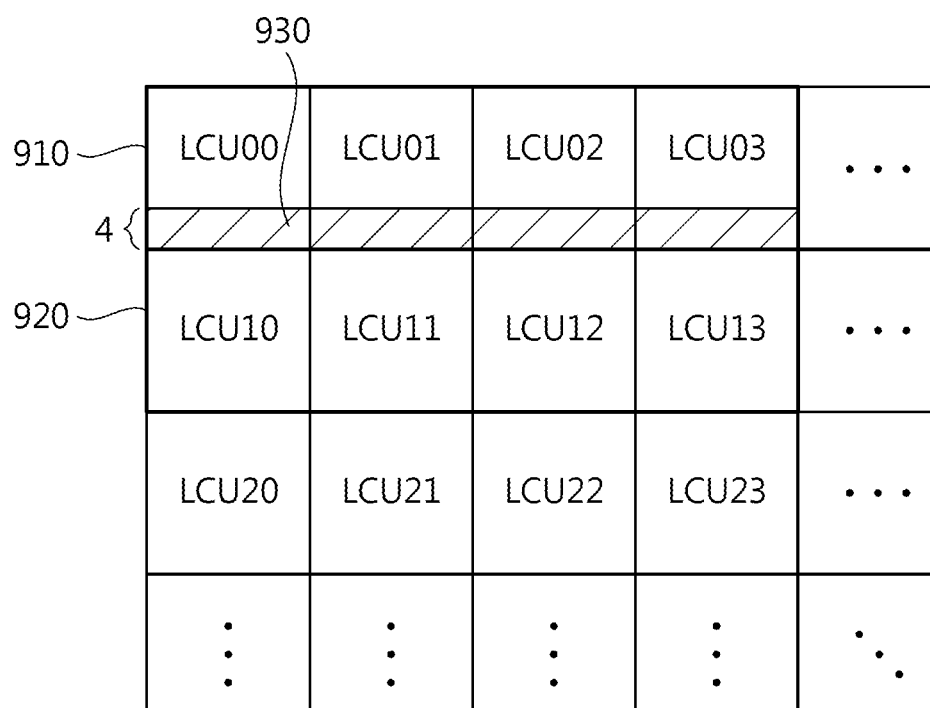
FIG. 9 is a drawing for explaining a line buffer in which an intra prediction mode is stored.

FIG. 9 is a drawing for explaining a line buffer in which an intra prediction mode is stored.

A plurality of LCUs of FIG. 9 are included in one picture, one slice, and/or one tile. Each square block of FIG. 9 may correspond to one LCU. In an LCUxy (where x and y are integers greater than or equal to 0) of FIG. 9, x may denote a row in which the LCU is located, and y may denote a column in which the LCU is located.

An intra predictor may perform a prediction process for each LCU shown in FIG. 9, and a process for the LCUs of FIG. 9 may be performed according to a raster scan order. For example, in the embodiment of FIG. 9, a process for an LCU line 920 corresponding to an LCU1y may be performed in a direction from the left to the right after a process for an LCU line 910 corresponding to an LCU0y is performed.

Meanwhile, as described above in the embodiments of FIG. 6 to FIG. 8, MPM candidates corresponding to one block (and/or PU) may be derived on the basis of an intra prediction mode of a neighboring block (and/or neighboring PU) adjacent to the block. Since the PU is a unit which belongs to an LCU, intra prediction modes derived from one LCU must be stored in a memory to process an LCU line located in a next row immediately next to the LCU line.

In this case, an encoder and a decoder may store one intra prediction mode for each intra mode storing unit. Herein, the 'intra mode storing unit' may imply a minimum unit by which an intra prediction mode is stored so as to be used in a prediction when performing the intra prediction. For example, the intra mode storing unit may correspond to a block having a size of 4×4.

As such, if the intra prediction mode is stored in a block unit having a specific size, intra prediction modes stored in intra mode storing units located in a lowermost portion in one LCU line may be stored in a buffer to process an LCU line located in a row immediately next to the LCU line. In this case, the intra mode storing units stored in the buffer may constitute one line, and hereinafter this is called an 'intra mode storing unit line' in the present invention.

It is assumed in FIG. 9 that the intra mode storing unit corresponds to a 4×4-sized block. Referring to FIG. 9, for a process for an LCU line 920 corresponding to an LCU1y, intra prediction modes stored in 4×4 blocks located in a lowermost portion in the LCU line 910 corresponding to an LCU0y may be stored in a buffer. 930 of FIG. 9 indicates an intra mode storing unit line consisting of 4×4 blocks located in a lowermost portion in the LCU line 910 corresponding to the LCU0y.

As in the aforementioned embodiment, intra prediction modes of an intra mode storing unit line located in a lower portion in an LCU line may be stored in a buffer to perform a process for a next LCU line. As such, the buffer which stores intra prediction modes belonging to the intra mode storing unit line may be called an 'intra mode line buffer'. Hereinafter, the intra mode line buffer may also be simply called a 'line buffer' in the present invention.

Figure 10:
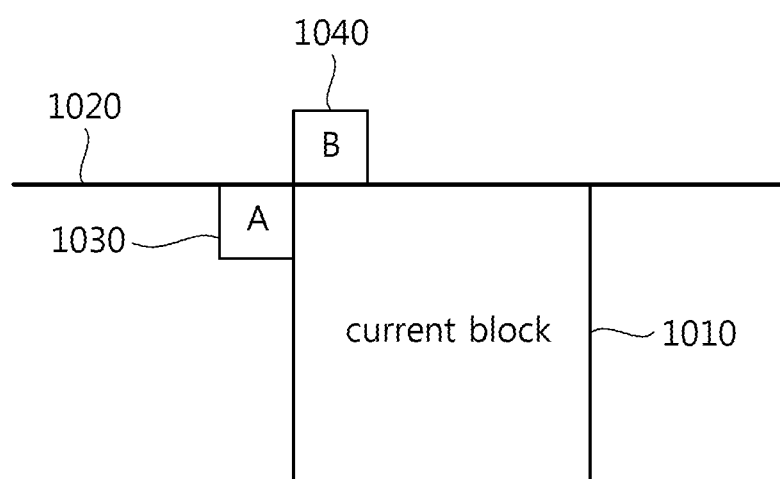
FIG. 10 is a schematic view showing an embodiment of a method of deriving an MPM candidate of a block adjacent to a boundary of a largest coding unit (LCU).

FIG. 10 is a schematic view showing an embodiment of a method of deriving an MPM candidate of a block adjacent to a boundary of an LCU. In the embodiment of FIG. 10, a current block 1010 and neighboring blocks 1030 and 1040 adjacent to the current block may be respective blocks corresponding to one PU.

Referring to FIG. 10, the current block 1010 may be a block located inside one LCU line, and may be a block adjacent to a boundary 1020 of the LCU. In addition, MPM candidates corresponding to the current block 1010 may be derived on the basis of a left candidate block A 1030 and an upper candidate block B 1040. In this case, the upper candidate block B may be a block belonging to an upper LCU line adjacent to an upper portion of a current LCU line to which the current block belongs. Since LCUs are processed according to a raster scan order, intra prediction modes of an intra mode storing unit line (e.g., a line consisting of 4×4-sized blocks) located in a lower portion in the LCU must be stored in an intra mode line buffer to process blocks belonging to the current LCU line (e.g., the current block 1010).

Therefore, a size of a line buffer may be increased in proportion to a width of a current picture to which the current block 1010 belongs. Since a coding/decoding performance may deteriorate when the size of the line buffer is increased as such, a method of deriving an MPM candidate and a method of storing an intra prediction mode may be provided to decrease the size of a line buffer memory.

Figure 11:
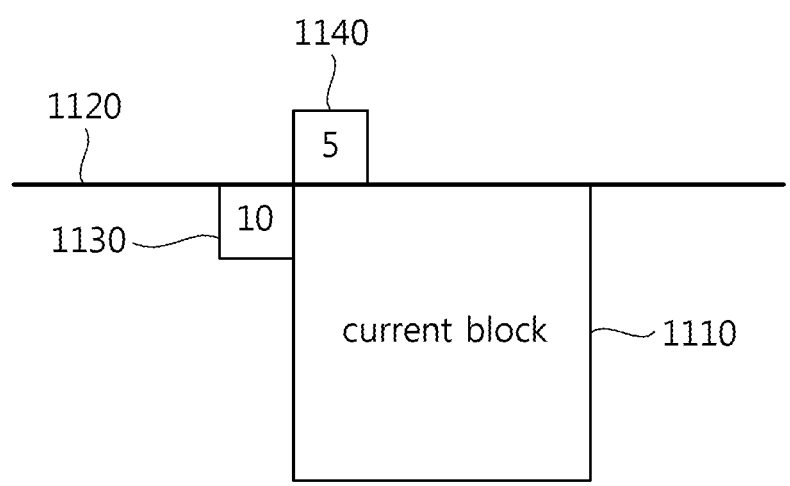
FIG. 11 is a schematic view showing an embodiment of a method of deriving an MPM candidate according to the present invention.

FIG. 11 is a schematic view showing an embodiment of a method of deriving an MPM candidate according to the present invention.

In the embodiment of FIG. 11, a current block 1110 and neighboring blocks 1130 and 1140 adjacent to the current block may be respective blocks corresponding to one PU. In addition, a number marked to the left candidate block A 1130 and the upper candidate block B 1140 may indicate an intra prediction mode value of each block. That is, in the embodiment of FIG. 11, an intra prediction mode value of the left candidate block 1130 may be 10, and an intra prediction mode value of the upper candidate block 1140 may be 5. In this case, the intra prediction mode value 10 may correspond to a horizontal mode, and the intra prediction mode value 5 may correspond to one of a plurality of angular modes assignable to the current block 1110.

Referring to FIG. 11, the current block 1110 may be a block located inside the current LCU, and may be a block adjacent to an upper boundary 1120 of the current LCU. In this case, an MPM candidate A derived in accordance with the left candidate block A 1130 may be an intra prediction mode of the left candidate block 1130, that is, a horizontal mode corresponding to the mode value 10.

However, since the upper candidate block B 1140 is a block belonging to an upper LCU adjacent to an upper portion of the current LCU, it must be stored in a line buffer in order for the intra prediction mode of the upper candidate block B 1140 to be used as an MPM candidate. Therefore, by not using the intra prediction mode of the upper candidate block B 1140 as the MPM candidate of the current block 1110, the intra predictor may remove a line buffer used to store the intra prediction mode. This is because, if the intra prediction mode of the upper candidate block B 1140 is not used as the MPM candidate of the current block 1110, the intra prediction mode of the upper candidate block B 1140 is not necessarily stored in the line buffer.

That is, if a neighboring block used to derive an MPM candidate of a current block exists outside an LCU to which the current block belongs (and/or outside a boundary of an LCU to which the current block belongs), the intra predictor may not use an intra prediction mode of the neighboring block as an MPM candidate corresponding to the neighboring block. This may apply only to the upper candidate block 1130 as in the aforementioned embodiment, but the present invention is not limited thereto. Therefore, this may also apply only to a left candidate block or both to the upper candidate block and the left candidate block. For example, if the current block is adjacent to a left boundary of a current LCU, an intra prediction mode of a left candidate block may not be used as an MPM candidate corresponding to the left candidate block.

If a neighboring block (i.e., a left candidate block and/or an upper candidate block) used to derive an MPM candidate of a current block is located outside a current LCU, a certain intra prediction mode determined by a specific condition may be determined as an MPM candidate corresponding to the neighboring block. For example, if the left candidate block is located outside the current LCU, an intra predictor may determine an MPM candidate A by assuming the intra prediction mode determined by the specific condition as an intra prediction mode of the left candidate block. In addition, if the upper candidate block is located outside the current LCU, the intra predictor may determine an MPM candidate B by assuming the intra prediction mode determined by the specific condition as an intra prediction mode of the upper candidate block. This may be regarded that a certain intra prediction mode determined by the specific condition is assigned to an intra prediction mode of a neighboring block.

In one embodiment, if a neighboring block (i.e., a left candidate block and/or an upper candidate block) used to derive an MPM candidate of a current block is located outside a current LCU, the intra predictor may determine a DC mode as an intra prediction mode of the neighboring block. In this case, the DC mode may be determined as an MPM candidate corresponding to the neighboring block. That is, the intra predictor may determine the DC mode as the MPM candidate corresponding to the neighboring block by assuming the intra prediction mode of the neighboring block to the DC mode.

For example, if the left candidate block is located outside the current LCU, the intra predictor may determine the DC mode as an intra prediction mode of the left candidate block. In this case, the DC mode may be determined to the MPM candidate A corresponding to the left candidate block. In addition, if the upper candidate block is located outside the current LCU, the intra predictor may determine the DC mode as an intra prediction mode of the upper candidate block. In this case, the DC mode may be determined to the MPM candidate mode B corresponding to the upper candidate block.

If an upper candidate block is located outside a current LCU, a process of determining the DC mode as an intra prediction mode of the upper candidate block may be described as follows in one embodiment.

The candidate intra prediction mode candIntraPredModeN is derived as follows.
    if N is equal to B and yB 1 is less than ((yB>>Log 2CtbSizeY)<<Log 2CtbSizeY), intraPredModeB is set equal to Intra_DC.

Herein, candIntraPredModeN may indicate an MPM candidate. In this case, if N is A, the candIntraPredModeN may correspond to an MPM candidate A corresponding to a left candidate block (i.e., a block A). In addition, if N is B, the candIntraPredModeN may correspond to an MPM candidate B corresponding to an upper candidate block (i.e., a block B). In addition, yB may denote a y-coordinate of a pixel located in a leftmost upper portion in the current block, and log 2CtbSizeY may denote a log value of a height (i.e., a size in a y-axis direction) of an LCU to which the current block belongs. In addition, intraPredModeB may denote an intra prediction mode of an upper candidate block, and Intra_DC may denote the DC mode.

For another embodiment, if a neighboring block (i.e., a left candidate block and/or an upper candidate block) used to derive an MPM candidate of a current block is located outside a current LCU, the intra predictor may determine a planar mode as an intra prediction mode of the neighboring block. In this case, the planar mode may be determined as an MPM candidate corresponding to the neighboring block. That is, the intra predictor may determine the planar mode as the MPM candidate corresponding to the neighboring block by assuming that the intra prediction mode of the neighboring block to the planar mode.

For example, if the left candidate block is located outside the current LCU, the intra predictor may determine the planar mode as an intra prediction mode of the left candidate block. In this case, the planar mode may be determined as an MPM candidate A corresponding to the left candidate block. In addition, if the upper candidate block is located outside the current LCU, the intra predictor may determine the planar mode as an intra prediction mode of the upper candidate block. In this case, the planar mode may be determined as an MPM candidate B corresponding to the upper candidate block.

Referring to FIG. 11, the upper candidate block B 1140 may be a block belonging to the upper LCU adjacent to the upper portion of the current LCU. Therefore, an intra predictor may not use an intra prediction mode of the upper candidate block B 1140, that is, an angular mode corresponding to the mode value 5, as an MPM candidate. In this case, for example, the intra predictor may determine the planar mode as an intra prediction mode of the upper candidate block B 1140. In this case, an MPM candidate B corresponding to the upper candidate block B 1140 may be determined to the planar mode. Herein, a mode value of the planar mode may be 0 for example.

Meanwhile, the neighboring block (e.g., the left candidate block and/or the upper candidate block) used to derive the MPM candidate of the current block may be unavailable. For example, if the neighboring block (i.e., the left candidate block and/or the upper candidate block) is located outside a current picture to which the current block belongs (and/or an outside a current picture boundary to which the current block belongs), the neighboring block may correspond to the unavailable block. In addition, if the neighboring block (i.e., the left candidate block and/or the upper candidate block) is located outside a current slice to which the current block belongs (and/or an outside a current slice boundary to which the current block belongs), the neighboring block may correspond to the unavailable block.

In addition, even in a case where the neighboring block itself (e.g., a left candidate block and/or an upper candidate block) used to derive the MPM candidate of the current block is available, a prediction mode of the neighboring block may not be an intra mode. In this case, the neighboring block may not include valid intra prediction mode information.

As described above, if the neighboring block (i.e., the left candidate block and/or the upper candidate block) is unavailable or if the prediction mode of the neighboring block is not the intra mode, the intra prediction may determine a certain intra prediction mode determined by a specific condition to an MPM candidate corresponding to the neighboring block.

In one embodiment, if the neighboring block (i.e., the left candidate block and/or the upper candidate block) is unavailable or if the prediction mode of the neighboring block is not the intra mode, the intra predictor may determine the DC mode to the MPM candidate corresponding to the neighboring block. That is, the intra predictor may determine the DC mode to the MPM candidate corresponding to the neighboring block by assuming the intra prediction mode of the neighboring block to the DC mode. For example, if the left candidate block is unavailable or is not the intra block, the intra predictor may determine the DC mode to an MPM candidate A corresponding to the left candidate block. In addition, if the upper candidate block is unavailable or is not the intra block, the intra predictor may determine the DC mode to an MPM candidate B corresponding to the upper candidate block.

If the neighboring block (i.e., the left candidate block and/or the upper candidate block) is unavailable or if the prediction mode of the neighboring block is not the intra mode, a process of determining the DC mode to the MPM candidate corresponding to the neighboring block may be expressed as follows in one embodiment.

The candidate intra prediction mode candIntraPredModeN is derived as follows.
    If availableN is equal to FALSE, candIntraPredModeN is set equal to Intra_DC.
    Otherwise, if PredMode[xBN][yBN] is not equal to MODE_INTRA, candIntraPredModeN is set equal to Intra_DC, Herein, availableN may indicate whether a neighboring block (i.e., a left candidate block and/or an upper candidate block) is available. In this case, if N is A, the availableN may indicate whether the left candidate block (i.e., block A) is available, and if N is B, the availableN may indicate whether the upper candidate block (i.e., block B) is available. In addition, PredMode[xBN][yBN] may indicate a prediction mode of the neighboring block (i.e., the left candidate block and/or the upper candidate block), and MODE_INTRA may indicate the intra mode.

For another example, if the neighboring block (i.e., the left candidate block and/or the upper candidate block) is unavailable or if the prediction mode of the neighboring block is not the intra mode, the intra predictor may determine the planar mode to an MPM candidate corresponding to the neighboring mode. That is, the intra predictor may determine the planar mode as an MPM candidate corresponding to the neighboring block, by assuming the intra prediction mode of the neighboring block as the planar mode. For example, if the left candidate block is unavailable or is not the intra block, the intra predictor may determine the planar mode to an MPM candidate A corresponding to the left candidate block. In addition, if the upper candidate block is unavailable or is not the intra block, the intra predictor may determine the planar mode as an MPM candidate B corresponding to the upper candidate block.

In another embodiment, if the neighboring block (i.e., the left candidate block and/or the upper candidate block) is unavailable or if the prediction mode of the neighboring block is not the intra mode, the intra predictor may determine an intra prediction mode of a different neighboring block adjacent to the neighboring block to an MPM candidate corresponding to the neighboring block. For example, if the left candidate block is unavailable or is not an intra block, the intra predictor may determine the intra prediction mode of the different neighboring block adjacent to the left candidate block to an MPM candidate A corresponding to the left candidate block. In addition, if the upper candidate block is unavailable or is not the intra block, the intra predictor may determine an intra prediction mode of a different neighboring block adjacent to the upper candidate block to an MPM candidate B corresponding to the upper candidate block.

In the aforementioned embodiments of FIG. 11 and its subsequent figures, the MPM candidate A may be determined on the basis of a location of the left candidate block (i.e., whether it exists outside a picture, slice, and/or LCU to which the current block belongs) and/or the prediction mode of the left candidate block, and the MPM candidate B may be determined on the basis of a location (i.e., whether it exists outside a picture, slice, and/or LCU to which the current block belongs) and/or the prediction mode of the upper candidate block. The aforementioned embodiments of FIG. 11 and its subsequent figures may be applied independently or may be combined in a selective manner to be applied to a method of deriving an MPM candidate.

For example, if the upper candidate block is located outside the current LCU, the intra predictor may determine the intra prediction mode of the upper candidate block to the DC mode (or planar mode). In this case, the MPM candidate B corresponding to the upper candidate block may be determined to the DC mode (or planar mode). In addition, if the upper candidate block is unavailable or is not an intra block, the intra predictor may determine the DC mode (or planar mode) to the MPM candidate B corresponding to the upper candidate block.

In addition, if the left candidate block is unavailable or is not the intra block, the intra predictor may determine the DC mode (or planar mode) to the MPM candidate B corresponding to the left candidate block. However, if the left candidate block is located outside the current LCU, unlike the upper candidate block, the intra prediction mode of the left candidate block may be determined directly to the MPM candidate A.

In this case, since the intra prediction mode of the upper candidate block is not used as the MPM candidate of the current block, the intra predictor may derive the MPM candidate without having to use an intra mode line buffer. Therefore, a line buffer may be removed in the aforementioned embodiment.

Figure 12:
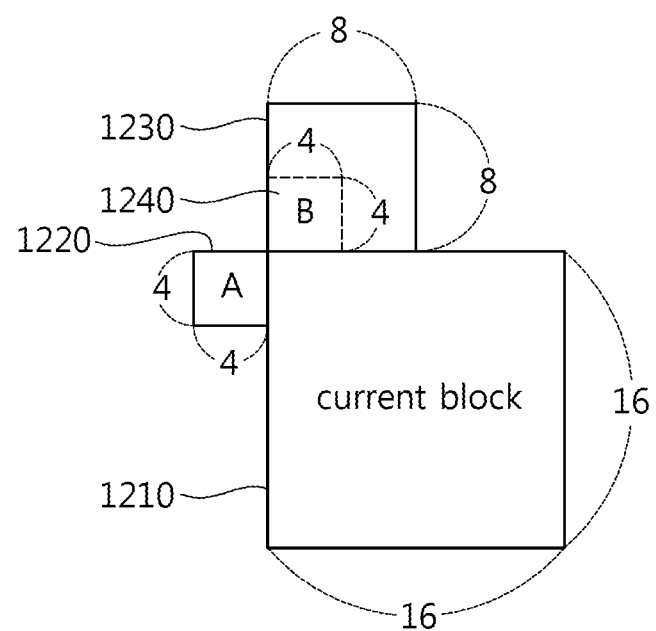
FIG. 12 is a schematic view showing an embodiment of a method of deriving an MPM candidate on the basis of an intra mode storing unit.

FIG. 12 is a schematic view showing an embodiment of a method of deriving an MPM candidate on the basis of an intra mode storing unit. In the embodiment of FIG. 12, a current block 1210, a left candidate block A 1220, and an upper candidate block B 1230 may be respective blocks corresponding to one PU.

As described above, MPM candidates of the current block 1210 may be derived on the basis of an intra prediction mode of the left candidate block A 1220 and an intra prediction mode of the upper candidate block B 1230. In this case, the intra prediction mode of the left candidate block A 1220 and the intra prediction mode of the upper candidate block B 1230 must be stored in a buffer to process the current block 1210. In particular, if the current block 1210 is adjacent to an upper boundary of a current LCU including the current block 1210, the intra prediction mode of the upper candidate block B 1230 may be stored in an intra mode line buffer. In this case, for each intra mode storing unit, one intra prediction mode may be stored in the buffer. It is assumed in the embodiment of FIG. 12 that the intra mode storing unit corresponds to a 4×4-sized block.

The intra prediction mode of the left candidate block A 1220 may be acquired from a block located in an uppermost portion among 4×4-sized blocks (i.e., the intra mode storing unit) adjacent to a left side of the current block 1210. In this case, the 4×4-sized block by which the intra prediction mode is acquired may be an intra mode storing unit belonging to the left candidate block A 1220. In the embodiment of FIG. 12, since the left candidate block A 1220 has a size of 4×4, the intra mode storing unit may have the same size as the left candidate block A 1220.

In addition, the intra prediction mode of the upper candidate block B 1230 may be acquired from a block 1240 located in a leftmost side among 4×4-sized blocks (i.e., the intra mode storing unit) adjacent to an upper portion of the current block 1210. In this case, the 4×4-sized block 1240 may be an intra mode storing unit belonging to the upper candidate block B 1230. In the embodiment of FIG. 12, since the upper candidate block B 1230 has a size of 8×8, the intra mode storing unit may have a size less than that of the upper candidate block B 1230. In this case, the 4×4-sized block 1240 by which the intra prediction mode is acquired may be a block located in a lowermost portion in the upper candidate block B 1230.

As described above in the aforementioned embodiment, if the intra mode storing unit is the 4×4-sized block, one intra prediction mode can be stored for each 4×4-sized block. In this case, since a load of a buffer (and/or a line buffer) in which the intra prediction mode is stored may be great, an encoder and a decoder may store one intra prediction mode with respect to a plurality of 4×4-sized blocks, thereby being able to decrease a size of the buffer (and/or the line buffer).

For example, the encoder and the decoder may store one intra prediction mode (and/or line buffer) for each of two 4×4-sized blocks. In this case, a size of the intra mode storing unit may correspond to a 8×4-sized block. In addition, the number of intra prediction modes stored in the buffer (and/or line buffer) and a size of the buffer (and/or line buffer) may be decreased by ½. Therefore, such a method of storing an intra prediction mode may also be called '2:1 buffer (and/or line buffer) compression' or '2:1 intra mode compression'.

For another example, the encoder and the decoder may store one intra prediction mode in the buffer (and/or line buffer) for each of four 4×4-sized blocks. In this case, the size of the intra mode storing unit may correspond to a 16×4-sized block. In addition, the number of intra prediction modes stored in the buffer (and/or line buffer) and a size of the buffer (and/or line buffer) may be decreased by ¼. Therefore, such a method of storing an intra prediction mode may also be called '4:1 buffer (and/or line buffer) compression' or '4:1 intra mode compression'.

As described above, if the size of the intra mode storing unit is extended, the encoder and the decoder may store only an intra prediction mode assigned to one block in the buffer (and/or line buffer) among 4×4-sized blocks belonging to the intra mode storing unit. In this case, the encoder and the decoder may use only one intra prediction mode to derive an MPM candidate among a plurality of intra prediction modes included in one intra mode storing unit. That is, when the MPM candidate is derived on the basis of an intra prediction mode of a block located outside a current LCU (i.e., an LCU to which the current block belongs), the encoder and the decoder may use only a compressed intra prediction mode stored in a buffer (and/or line buffer) having a decreased size.

Although the line buffer is removed in the aforementioned embodiment of FIG. 11, if an intra mode compression scheme (and/or a line buffer compression scheme) is used, the line buffer may not be removed and only the size of the line buffer may be decreased. Therefore, since an intra prediction mode of a neighboring block can be considered when the MPM candidate is derived, the intra prediction mode can be more accurately predicted in comparison with the embodiment of FIG. 11.

Figure 13:
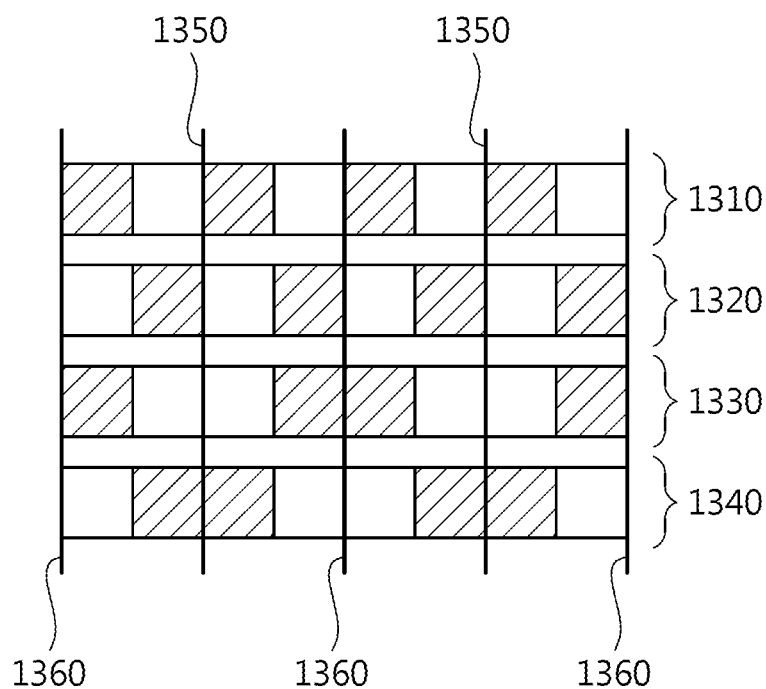
FIG. 13 is a schematic view showing embodiments of a 2:1 line buffer compression scheme.
Figure 13:
Figure 13:

FIG. 13 is a schematic view showing embodiments of a 2:1 line buffer compression scheme.

1310 to 1340 of FIG. 13 indicate respective intra mode storing unit lines. As described above with reference to FIG. 9, intra prediction modes stored in the intra mode storing unit may be used to process a lower LCU line adjacent to a lower portion of an LCU line to which the intra mode storing unit line belongs. If a current block is a block belonging to the lower LCU line, an upper candidate block corresponding to the current block may be a block belonging to an LCU line adjacent to an upper portion of the lower LCU line. In this case, an intra predictor may use an intra prediction mode stored in the intra mode storing unit line to derive an MPM candidate of the current block.

Each square block of FIG. 13 indicates a 4×4-sized block. In addition, in the embodiment of FIG. 13, a line 1350 indicates a line corresponding to a boundary of a 8×8-sized block (hereinafter, called '8×8 block boundary'), and a line 1360 indicates a line corresponding to a boundary of a 16×16-sized block (hereinafter, called '16×16 block boundary'). Although the boundary of the 16×16-sized block may correspond to the boundary of the 8×8-sized block, the line 1360 may also be referred to as the 16×16 block boundary in the embodiment of FIG. 13.

Referring to FIG. 13, one intra mode storing unit line may consist of a plurality of intra mode storing units. In this case, the intra mode storing unit may consist of two 4×4-sized blocks, and may have a size of 8×4. That is, an encoder and a decoder may store one intra prediction mode for each of two 4×4 blocks. In this case, a size of a memory used to store the intra prediction mode may be decreased by ½. In the embodiment of FIG. 13, each intra mode storing unit constituting the intra mode storing unit line may be located between one 8×8 block boundary and one 16×16 block boundary adjacent thereto.

In the 2:1 line buffer compression scheme, only an intra prediction mode corresponding to one block may be stored in a line buffer between two 4×4-sized blocks constituting one intra mode storing unit line. In this case, an upper candidate block referred by a current block to derive an MPM candidate may include a 4×4 block of which an intra prediction mode is not stored in a line buffer. In this case, the encoder and/or the decoder may use an intra prediction mode of another 4×4 block (i.e., a block in which an intra prediction mode is stored) belonging to the same intra mode storing unit as the 4×4 block to derive an MPM candidate.

Referring to 1310 of FIG. 13, the encoder and the decoder may store only an intra prediction mode of a block located in a left side into the line buffer between two 4×4-sized blocks belonging to the intra mode storing unit. In this case, a block referred by the current block to derive an MPM candidate may be a 4×4-sized block located in a right side in an intra mode storing unit (e.g., a block included in an upper candidate block corresponding to the current block). In this case, the encoder and the decoder may use an intra prediction mode of a block located in a left side in the intra mode storing unit to derive the MPM candidate.

That is, in the embodiment of 1310 of FIG. 13, a 4×4 block located in a left side in the intra mode storing unit may represent two 4×4 blocks belonging to the intra mode storing unit. In addition, a 4×4 block located in a right side in the intra mode storing unit may share an intra prediction mode of a 4×4 block located in a left side.

Referring to 1320 of FIG. 13, the encoder and the decoder may store only an intra prediction mode of a block located in a right side into the line buffer between two 4×4-sized blocks belonging to the intra mode storing unit. In this case, a block referred by the current block to derive an MPM candidate may be a 4×4-sized block located in a left side in an intra mode storing unit (e.g., a block included in an upper candidate block corresponding to the current block). In this case, the encoder and the decoder may use an intra prediction mode of a block located in a right side in the intra mode storing unit to derive the MPM candidate.

That is, in the embodiment of 1320 of FIG. 13, a 4×4 block located in a right side in the intra mode storing unit may represent two 4×4 blocks belonging to the intra mode storing unit. In addition, a 4×4 block located in a left side in the intra mode storing unit may share an intra prediction mode of a 4×4 block located in a right side.

Referring to 1330 of FIG. 13, the encoder and the decoder may store only an intra prediction mode of a block adjacent to the 16×16 block boundary 1360 between two 4×4-sized blocks belonging to the intra mode storing unit. In this case, a block referred by the current block to derive an MPM candidate may be a 4×4-sized block adjacent to the 8×8 block boundary 1350 in the intra mode storing unit (e.g., a block included in an upper candidate block corresponding to the current block). In this case, the encoder and the decoder may use an intra prediction mode of a block adjacent to the 16×16 block boundary 1360 in the intra mode storing unit to derive the MPM candidate.

That is, in the embodiment of 1330 of FIG. 13, a 4×4 block adjacent to the 16×16 block boundary 1360 in the intra mode storing unit may represent two 4×4 blocks belonging to the intra mode storing unit. In addition, a 4×4 block adjacent to the 8×8 block boundary 1350 in the intra mode storing unit may share an intra prediction mode of a 4×4 block located adjacent to the 16×16 block boundary 1360.

Referring to 1340 of FIG. 13, the encoder and the decoder may store only an intra prediction mode of a block adjacent to the 8≠8 block boundary 1350 between two 4×4-sized blocks belonging to the intra mode storing unit. In this case, a block referred by the current block to derive an MPM candidate may be a 4×4-sized block adjacent to the 16×16 block boundary 1360 in the intra mode storing unit (e.g., a block included in an upper candidate block corresponding to the current block). In this case, the encoder and the decoder may use an intra prediction mode of a block adjacent to the 8×8 block boundary 1350 in the intra mode storing unit to derive the MPM candidate.

That is, in the embodiment of 1340 of FIG. 13, a 4×4 block adjacent to the 8×8 block boundary 1350 in the intra mode storing unit may represent two 4×4 blocks belonging to the intra mode storing unit. In addition, a 4×4 block adjacent to the 16×16 block boundary 1360 in the intra mode storing unit may share an intra prediction mode of a 4×4 block located adjacent to the 8×8 block boundary 1350.

Figure 14:
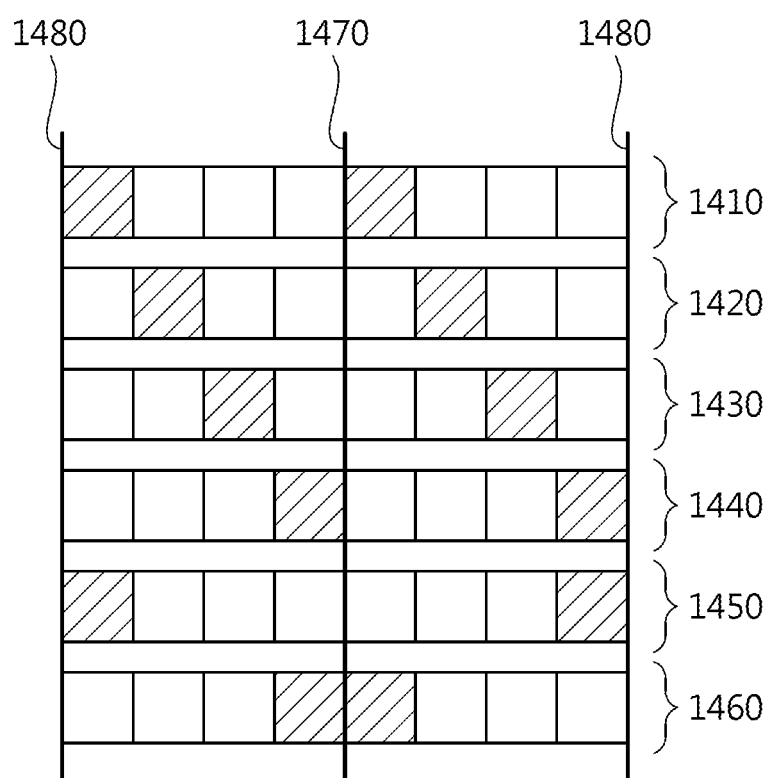
FIG. 14 is a schematic view showing embodiments of a 4:1 line buffer compression scheme.
Figure 14:
Figure 14:

FIG. 14 is a schematic view showing embodiments of a 4:1 line buffer compression scheme.

1410 to 1440 of FIG. 14 indicate respective intra mode storing unit lines. As described above with reference to FIG. 9, intra prediction modes stored in the intra mode storing unit may be used to process a lower LCU line adjacent to a lower portion of an LCU line to which the intra mode storing unit line belongs. If a current block is a block belonging to the lower LCU line, an upper candidate block corresponding to the current block may be a block belonging to an LCU line adjacent to an upper portion of the lower LCU line. In this case, an intra predictor may use an intra prediction mode stored in the intra mode storing unit line to derive an MPM candidate of the current block.

Each square block of FIG. 14 indicates a 4×4-sized block. In addition, in the embodiment of FIG. 14, a line 1470 indicates a line corresponding to a boundary of a 16×16-sized block (hereinafter, called '16×16 block boundary'), and a line 1480 indicates a line corresponding to a boundary of a 32×32-sized block (hereinafter, called '32×32 block boundary'). Although the boundary of the 32×32-sized block may correspond to the boundary of the 16×16-sized block, the line 1480 may also be referred to as the 32×32 block boundary in the embodiment of FIG. 14.

Referring to FIG. 14, one intra mode storing unit line may consist of a plurality of intra mode storing units. In this case, the intra mode storing unit may consist of four 4×4-sized blocks, and may have a size of 16×4. That is, an encoder and a decoder may store one intra prediction mode for each of four 4×4 blocks. In this case, a size of a memory used to store the intra prediction mode may be decreased by ¼. In the embodiment of FIG. 14, each intra mode storing unit constituting the intra mode storing unit line may be located between two 16×16 block boundaries adjacent to each other.

Hereinafter, among the four 4×4-sized blocks constituting the intra mode storing unit in the embodiment of FIG. 14, a block located in a leftmost side is called a first 4×4 block, and a 4×4-sized block adjacent to the first 4×4 block is called a second 4×4 block. In addition, in the embodiment of FIG. 14, a 4×4-sized block adjacent to a right size of the second 4×4 block in the intra mode storing unit is called a third 4×4 block, and a 4×4-sized block adjacent to a right side of the third 4×4 block is called a fourth 4×4 block.

In the 4:1 line buffer compression scheme, only an intra prediction mode corresponding to one block may be stored in a line buffer among four 4×4-sized blocks constituting one intra mode storing unit line. In this case, an upper candidate block referred by the current block to derive an MPM candidate may include a 4×4 block of which an intra prediction mode is not stored in a line buffer. In this case, the encoder and/or the decoder may use an intra prediction mode stored in a line buffer among intra prediction modes of other 4×4 blocks belonging to the same intra mode storing unit as the 4×4 block to derive an MPM candidate.

Referring to 1410 of FIG. 14, the encoder and the decoder may store only an intra prediction mode of the first 4×4 block among the four 4×4-sized blocks belonging to the intra mode storing unit. In this case, a block referred by the current block to derive an MPM candidate may be another 4×4 block (e.g., the second 4×4 block, the third 4×4 block, or the fourth 4×4 block) other than the first 4×4 block. In this case, the encoder and the decoder may use an intra prediction mode of the first 4×4 block in the intra mode storing unit to derive the MPM candidate.

That is, in the embodiment of 1410 of FIG. 14, the first 4×4 block in the intra mode storing unit may represent the four 4×4 blocks belonging to the intra mode storing unit. In addition, the second 4×4 block, third 4×4 block, and fourth 4×4 block in the intra mode storing unit may share the intra prediction mode of the first 4×4 block.

Referring to 1420 of FIG. 14, the encoder and the decoder may store only an intra prediction mode of the second 4×4 block into the line buffer among the four 4×4-sized blocks belonging to the intra mode storing unit. In this case, a block referred by the current block to derive an MPM candidate may be another 4×4 block (e.g., the first 4×4 block, the third 4×4 block, or the fourth 4×4 block) other than the second 4×4 block. In this case, the encoder and the decoder may use an intra prediction mode of the second 4×4 block in the intra mode storing unit to derive the MPM candidate.

That is, in the embodiment of 1420 of FIG. 14, the second 4×4 block in the intra mode storing unit may represent the four 4×4 blocks belonging to the intra mode storing unit. In addition, the first 4×4 block, third 4×4 block, and fourth 4×4 block in the intra mode storing unit may share an intra prediction mode of the second 4×4 block.

Referring to 1430 of FIG. 14, the encoder and the decoder may store only an intra prediction mode of the third 4×4 block among the four 4×4-sized blocks belonging to the intra mode storing unit. In this case, a block referred by the current block to derive an MPM candidate may be another 4×4 block (e.g., the first 4×4 block, the second 4×4 block, or the fourth 4×4 block) other than the third 4×4 block. In this case, the encoder and the decoder may use an intra prediction mode of the third 4×4 block in the intra mode storing unit to derive the MPM candidate.

That is, in the embodiment of 1430 of FIG. 14, the third 4×4 block in the intra mode storing unit may represent the four 4×4 blocks belonging to the intra mode storing unit. In addition, the first 4×4 block, second 4×4 block, and fourth 4×4 block in the intra mode storing unit may share an intra prediction mode of the third 4×4 block.

Referring to 1440 of FIG. 14, the encoder and the decoder may store only an intra prediction mode of the fourth 4×4 block among the four 4×4-sized blocks belonging to the intra mode storing unit. In this case, a block referred by the current block to derive an MPM candidate may be another 4×4 block (e.g., the first 4×4 block, the second 4×4 block, or the third 4×4 block) other than the fourth 4×4 block. In this case, the encoder and the decoder may use an intra prediction mode of the fourth 4×4 block in the intra mode storing unit to derive the MPM candidate.

That is, in the embodiment of 1440 of FIG. 14, the fourth 4×4 block in the intra mode storing unit may represent the four 4×4 blocks belonging to the intra mode storing unit. In addition, the first 4×4 block, second 4×4 block, and third 4×4 block in the intra mode storing unit may share an intra prediction mode of the fourth 4×4 block.

Referring to 1450 of FIG. 14, the encoder and the decoder may store only an intra prediction mode of a block adjacent to the 32×32 block boundary 1480 among the four 4×4-sized blocks belonging to the intra mode storing unit. In this case, a block referred by the current block to derive an MPM candidate may be a 4×4 block not adjacent to the 32×32 block boundary 1480 in the intra mode storing unit. In this case, the encoder and the decoder may use an intra prediction mode of the block adjacent to the 32×32 block boundary 1480 in the intra mode storing unit to derive the MPM candidate.

That is, in the embodiment of 1450 of FIG. 14, the 4×4 block adjacent to the 32×32 block boundary 1480 in the intra mode storing unit may represent the four 4×4 blocks belonging to the intra mode storing unit. In addition, the three 4×4 blocks not adjacent to the 32×32 block boundary 1480 in the intra mode storing unit may share the intra prediction mode of the 4×4 block adjacent to the 32×32 block boundary 1480.

Referring to 1460 of FIG. 14, the encoder and the decoder may store only an intra prediction mode of the block adjacent to the 16×16 block boundary 1470 among the four 4×4-sized blocks belonging to the intra mode storing unit. In this case, a block referred by the current block to derive an MPM candidate may be a 4×4 block not adjacent to the 16×16 block boundary 1470 in the intra mode storing unit. In this case, the encoder and the decoder may use an intra prediction mode of the block adjacent to the 16×16 block boundary 1470 in the intra mode storing unit to derive the MPM candidate.

That is, in the embodiment of 1460 of FIG. 14, the 4×4 block adjacent to the 16×16 block boundary 1470 in the intra mode storing unit may represent the four 4×4 blocks belonging to the intra mode storing unit. In addition, the three 4×4 blocks not adjacent to the 16×16 block boundary 1470 in the intra mode storing unit may share an intra prediction mode of the 4×4 block adjacent to the 16×16 block boundary 1470.

In 1410 to 1460 of FIG. 14 described above, embodiments of a block of which an intra prediction mode is stored among the four 4×4 blocks belonging to the intra mode storing unit are described. However, the present invention is not limited thereto, and thus 4:1 line buffer compression may also equally or similarly apply to a case where a location of the block of which the intra prediction mode is stored is determined differently from those described above in 1410 to 1460 of FIG. 14.

Meanwhile, the aforementioned buffer (and/or line buffer) compression scheme described in the embodiments of FIG. 12 to FIG. 14 may apply to all blocks to be encoded/decoded in an intra mode for one example, or may apply only to a block adjacent to an LCU boundary for another example. For another example, the buffer (and/or line buffer) compression scheme may apply to both of a left candidate block and an upper candidate block which are used to derive an MPM candidate, or may apply only to one block between the left candidate block and the upper candidate block.

Such embodiments may be applied independently or may be combined in a selective manner to be applied to a process of deriving an MPM candidate.

For example, the encoder and the decoder may not apply the aforementioned buffer (and/or line buffer) to the left candidate block. In this case, intra prediction modes corresponding to the left candidate block may be stored in a buffer (and/or line buffer) in a 4×4 block unit. In addition, the encoder and the decoder may apply the aforementioned buffer (and/or line buffer) to the upper candidate block. In this case, as to the upper candidate block, one intra prediction mode may be stored for each of two (or four) 4×4 blocks. In this case, a size of the buffer (and/or line buffer) used to store the intra prediction mode may be decreased by ½ (or ¼).

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A decoding apparatus for an intra prediction, the decoding apparatus comprising:
   a memory; and
   at least one processor connected to the memory, the at least one processor configured to:
   derive a first intra prediction mode based on a left neighboring block of a current block;
   derive a second intra prediction mode based on an upper neighboring block of the current block;
   determine an intra prediction mode for the current block based on the first intra prediction mode and the second intra prediction mode; and
   generate prediction samples on the current block based on the determined intra prediction mode,
   wherein when the upper neighboring block is not located in a current largest coding unit, LCU, in which the current block is located, the second intra prediction mode is set equal to an intra planar mode.

2. An encoding apparatus for an intra prediction, the encoding apparatus comprising:
   a memory; and
   at least one processor connected to the memory, the at least one processor configured to:
   derive a first intra prediction mode based on a left neighboring block of a current block;
   derive a second intra prediction mode based on an upper neighboring block of the current block;
   determine an intra prediction mode for the current block based on the first intra prediction mode and the second intra prediction mode;
   generate prediction samples on the current block based on the determined intra prediction mode;
   generate information on the intra prediction mode; and
   encode image information including the information on the intra prediction mode,
   wherein when the upper neighboring block is not located in a current largest coding unit, LCU, in which the current block is located, the second intra prediction mode is set equal to an intra planar mode.

3. An apparatus for transmitting data for an image, the apparatus comprising:
   at least one processor configured to obtain a bitstream for the image, wherein the bitstream is generated based on deriving a first intra prediction mode based on a left neighboring block of a current block, deriving a second intra prediction mode based on an upper neighboring block of the current block, determining an intra prediction mode for the current block based on the first intra prediction mode and the second intra prediction mode, generating prediction samples on the current block based on the determined intra prediction mode, generating information on the intra prediction mode, and encoding image information including the information on the intra prediction mode; and a transmitter configured to transmit the data comprising the bitstream,
wherein when the upper neighboring block is not located in a current largest coding unit, LCU, in which the current block is located, the second intra prediction mode is set equal to an intra planar mode.

* * * * *